United States Patent [19]
Shih

[11] Patent Number: 5,517,599
[45] Date of Patent: May 14, 1996

[54] DATA RECORDING SYSTEM AND METHOD HAVING LOGICAL OVERRECORDING CAPABILITY

[75] Inventor: Lionel C. Shih, San Jose, Calif.

[73] Assignee: Ampex Corporation, Redwood City, Calif.

[21] Appl. No.: 843,454

[22] Filed: Feb. 28, 1992

[51] Int. Cl.⁶ .......................... G06F 12/00; G11B 15/18; G11B 5/86
[52] U.S. Cl. ............................ 395/410; 360/72.2; 369/84
[58] Field of Search ........................... 395/400, 425, 395/575; 364/DIG. 1, DIG. 2, 200 MS File, 900 MS File; 371/7, 10.2; 360/47, 48, 53, 72.1, 72.2; 369/84, 30

[56] References Cited

U.S. PATENT DOCUMENTS

| Re. 31,311 | 7/1983 | Miller | 360/40 |
|---|---|---|---|
| 4,637,023 | 1/1987 | Lounsbury et al. | 371/13 |
| 5,134,529 | 7/1992 | Inazawa et al. | 360/48 |
| 5,142,422 | 8/1992 | Zook et al. | 360/54 |

FOREIGN PATENT DOCUMENTS

| 0272130 | 6/1988 | European Pat. Off. . |
|---|---|---|
| 0323911 | 7/1990 | European Pat. Off. . |
| 0376217 | 7/1990 | European Pat. Off. . |
| WO A-9107744 | 5/1991 | WIPO . |

OTHER PUBLICATIONS

H. Goto et al., "A New Concept of Data/Dat System" IEEE Transactions on Consumer Electronics, vol. 35, No. 3, Aug. 1989 pp. 660–670.

"Proposed SMPTE Standard for Television Digital Component and Composite Recording" SMPTE Journal, Mar. 1992, pp. 190–203.

John Watkinson, "The D-2 Digital Video Recorder", Focal Press 1990 pp. 143–183.

*Primary Examiner*—Jack A. Lane
*Attorney, Agent, or Firm*—John G. Mesaros; Charles Barbas; James M. Thomson

[57] ABSTRACT

A recording and reproducing system which has the capability of recording user data and system format data in physical blocks of predetermined size on a recording area of a tape, with the user data being identified by files and contained in data blocks having a predetermined size. Partial overrecording of data blocks can be performed in that physical blocks are retained which have valid data blocks, and new physical blocks are then recorded beginning with a rewritten data block.

14 Claims, 19 Drawing Sheets

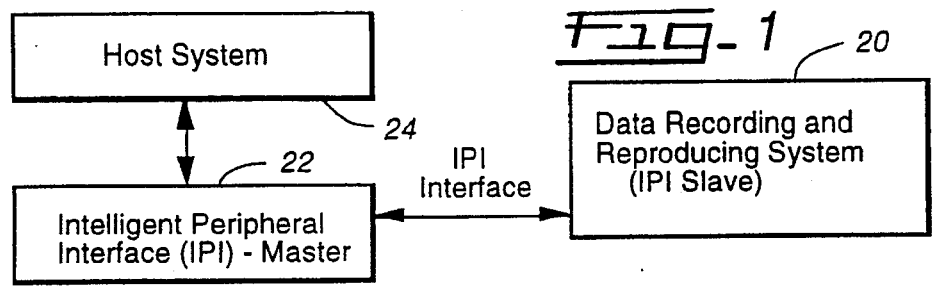
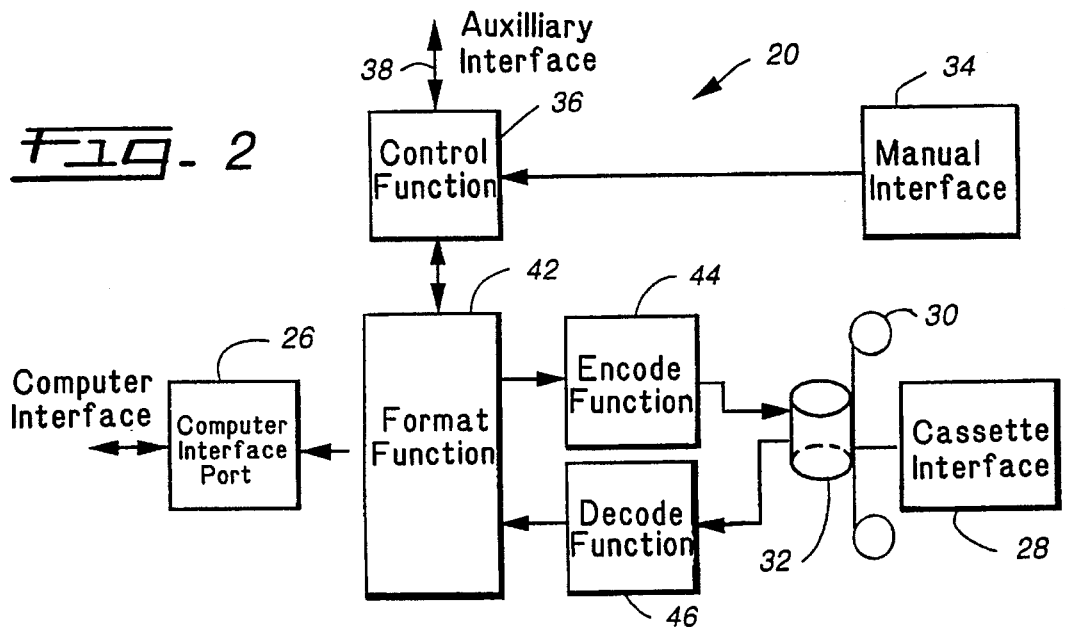
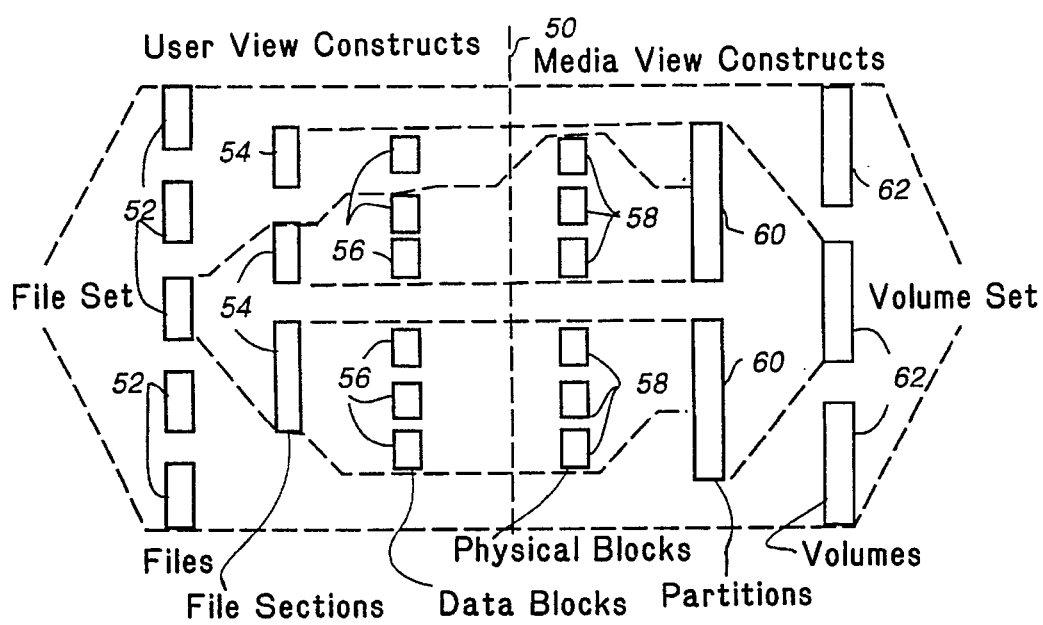

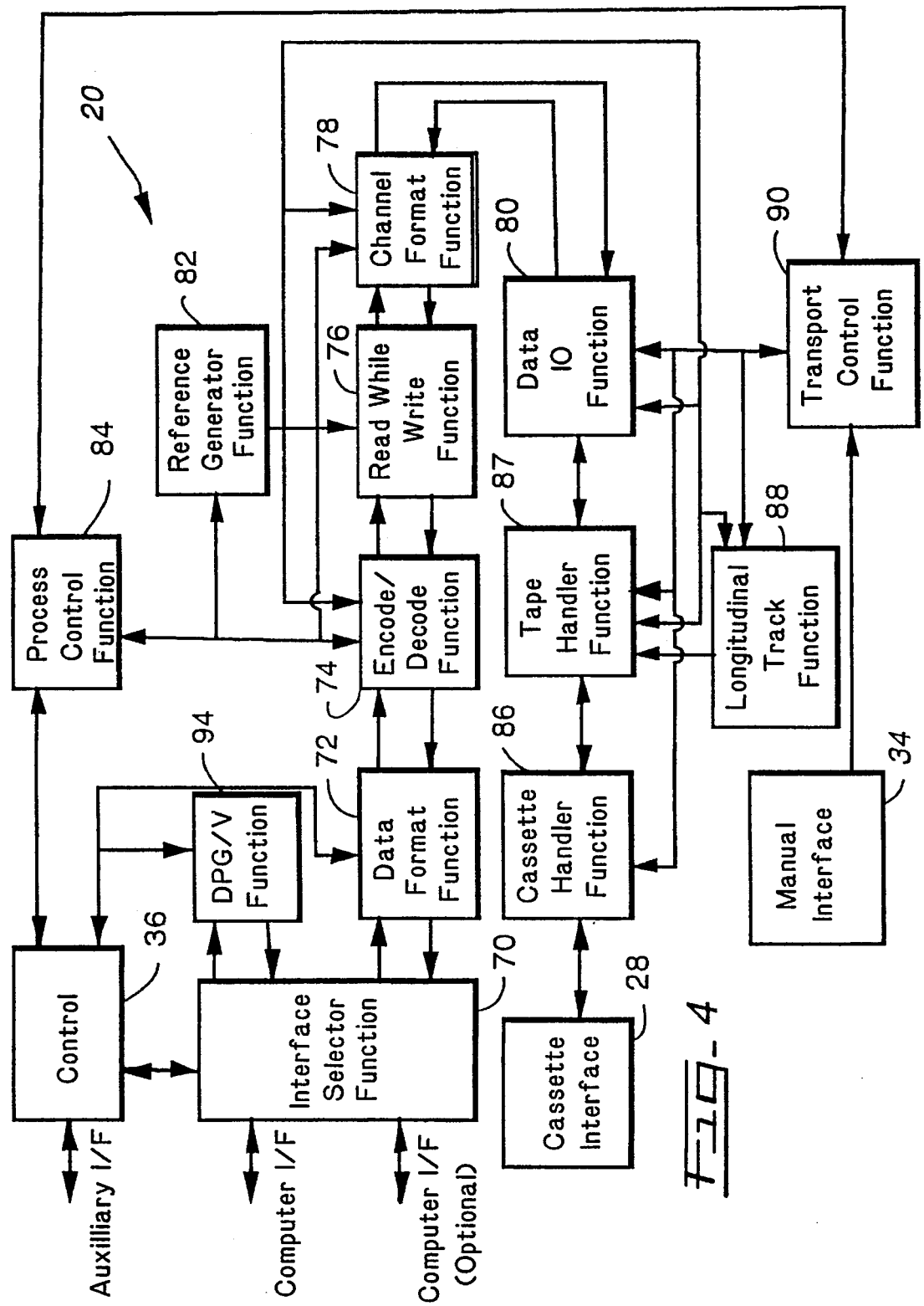

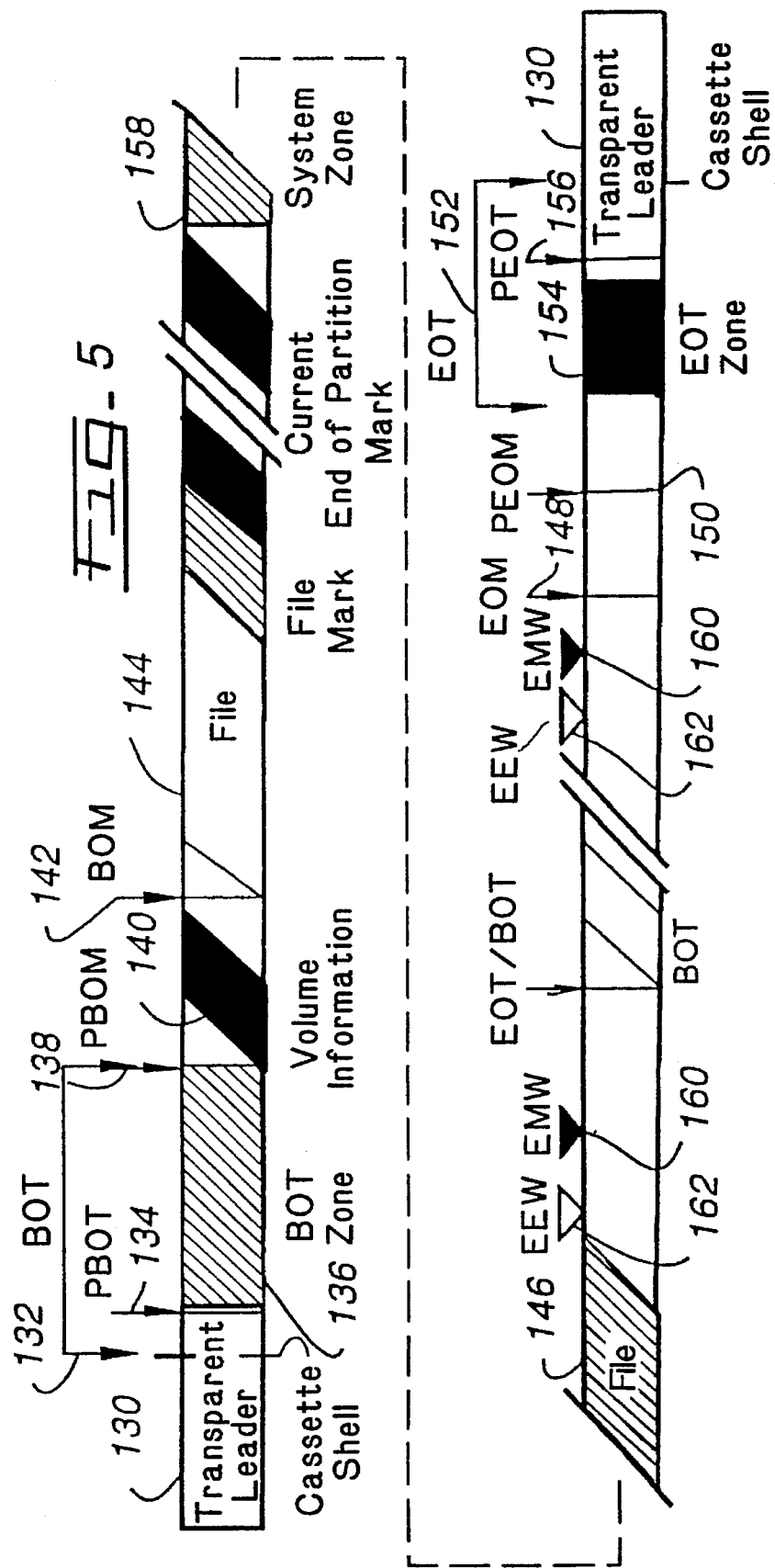

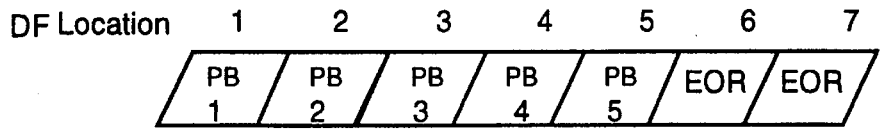
FIG. 9A
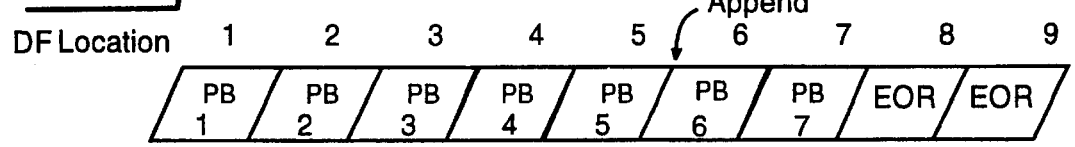
FIG. 9B
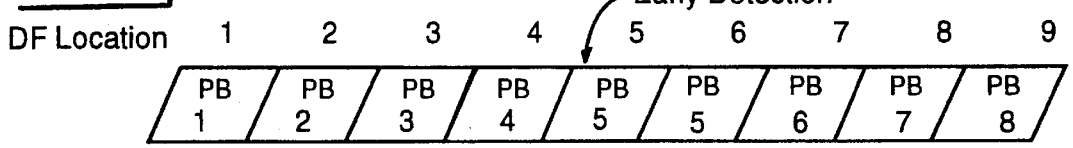
FIG. 9C
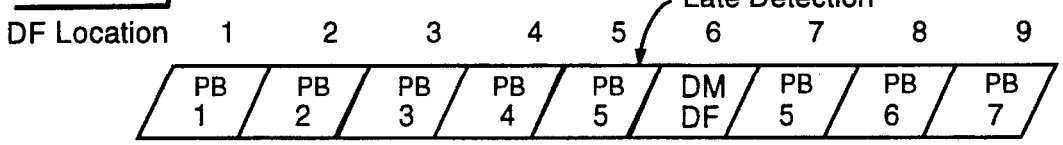
FIG. 9D
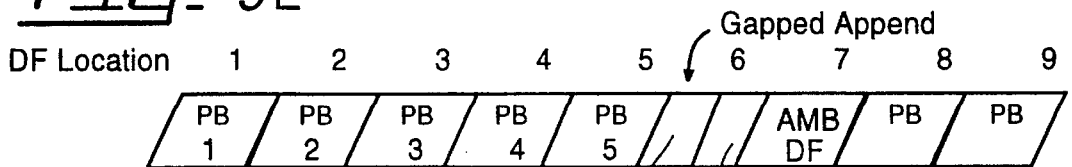
FIG. 9E
FIG. 9F
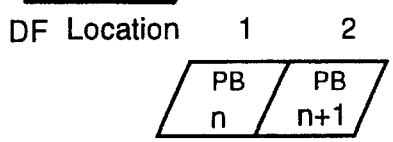
| | | |
|---|---|---|
| FSN | m | m |
| FDBN | 10 | 15 |
| LDBN | 21 | 35 |

| Front Padding (2.5 Bytes) | ANSI Sync Word (0.5 Byte) | Segment Information (18 Bytes) | Inverted ANSI Sync Word (0.5 Byte) | Rear Padding (2.5 Bytes) |
|---|---|---|---|---|

*Fig. 13*

| LATS Type | II or III or none | II | I or III or EOR | II | II | I or III or EOR | III or none |
|---|---|---|---|---|---|---|---|
| Helical | BOT | VFI | INFO | LOZ | BOT | INFO | EOT |
| PATS Type | I | I | I | I | I | I | I |

| PATS | LATS | | | |
|---|---|---|---|---|
| I | I | II | III | EOR |
| FID ADFN VLID SZSZ SZSP | ZNTY FSN FDBN CDBN | ZNTY PTLO LVPT LVSZ LDFN PGAS PGAC PGBS PGBC PGAPD PGBPD | 128 '0' bits (used as the init recording) | 36 ANSI SYNC Words (used only on the 2nd EOR DF of an EOR, an EOR/T or an EOR/E) |

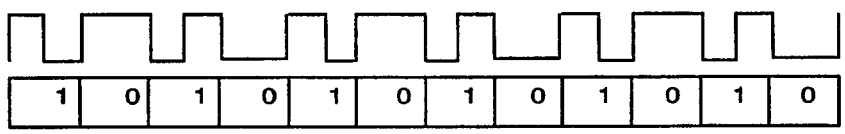
Fig. 16
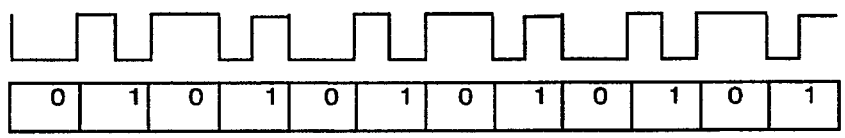
Fig. 17
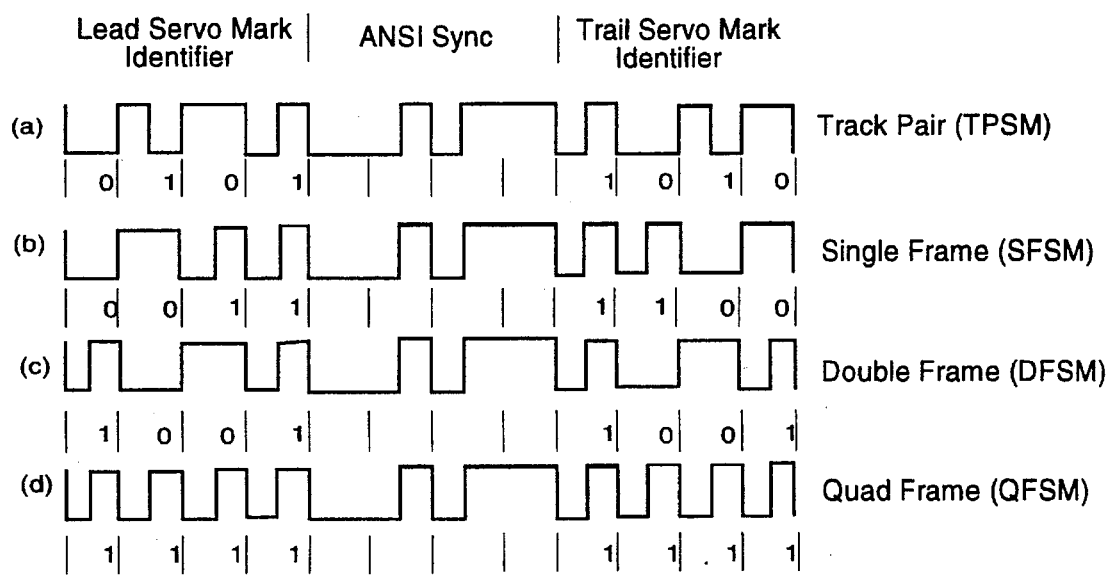
Fig. 18
Fig. 19
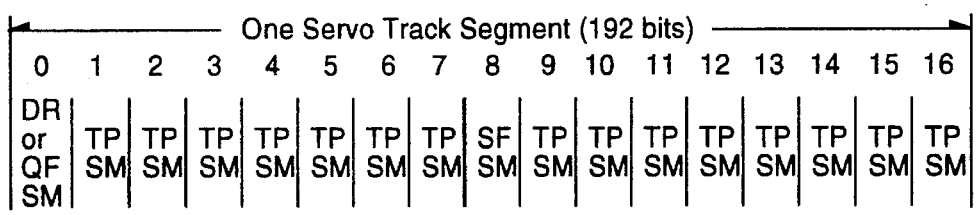

| BIT NUMBER | FIELD NAME | DEFINITION |
|---|---|---|
| 3, 2, 1 & 0 | HTTY | HELICAL TRACK TYPE<br><br>HTTY = 1111: EOR (NORMAL EOR)<br>HTTY = 1001: EOR/E (RECORDING ENDED WITH AN ERROR)<br>HTTY = 1010: EOR/T (TEMPORARY EOR)<br>HTTY = 1100: BOM TRACK<br>HTTY = 1011: DEMARK TRACK<br>HTTY = 0010: AMBLE TRACK<br>HTTY = 0101: DATA TRACK<br>HTTY = 0000: RESERVED |

Fig. 20

| BIT NO. | NAME | BIT DEFINITION |
|---|---|---|
| 7 | PFMT | PFMT = "1": PRE-FORMATTED<br>PFMT = "0": NOT PRE-FORMATTED |
| 6 | | RESERVED |
| 5 | SZEN | SZEN = "1": SYSTEM ZONE ENABLED<br>SZEN = "0": SYSTEM ZONE DISABLED |
| 4 | PTBL | PARTITION TABLE<br><br>PTBL = "1": PARTITION TABLE IS PROVIDED<br>PTBL = "0": PARTITION TABLE IS NOT PROVIDED |
| 3, 2, 1 & 0 | | RESERVED FOR RECORDING DENSITY VARIATION AND RECORDED WITH "000" FOR THE CURRENT FORMAT |

Fig. 23

| BYTE NO. | BIT NUMBER | FIELD NAME | COMMENTS |
|---|---|---|---|
| 0 | 7 THROUGH 0 | FID | FORMAT IDENTIFIER |
| 1 | 7 THROUGH 4 | ZNTY | ZONE TYPE |
|   | 3 THROUGH 0 | PTID1 /PGBPD | PARTITION IDENTIFIER IF ZNTY = "1111"; OTHERWISE, PARTITION GROUP B PHYSICAL BLOCK DOUBLE FRAME TYPE |
| 2 | 7 THROUGH 0 | PTID0 /SZID | PARTITION IDENTIFIER IF ZNTY = "1111"; OTHERWISE SYSTEM ZONE IDENTIFIER |
| 3 | 7 THROUGH 0 | FSN2 | FILE SECTION NUMBER |
| 4 | 7 THROUGH 0 | FSN1 | |
| 5 | 7 THROUGH 0 | FSN0 | |
| 6 | 7 THROUGH 0 | FDBN5 | FIRST DATA BLOCK/BYTE NUMBER |
| 7 | 7 THROUGH 0 | FDBN4 | |
| 8 | 7 THROUGH 0 | FDBN3 | |
| 9 | 7 THROUGH 0 | FDBN2 | |
| 10 | 7 THROUGH 0 | FDBN1 | |
| 11 | 7 THROUGH 0 | FDBN0 | |
| 12 | 7 | DB/D | DATA BLOCK/BYTE |
|   | 6 | DCSE | DATA BLOCK CHECKSUM ENABLE |
|   | 5 | EMWF | EMW FLAG |
|   | 4 THROUGH 0 | DBS2 | DATA BLOCK SIZE |
| 13 | 7 THROUGH 0 | DBS1 | |
| 14 | 7 THROUGH 0 | DBS0 | |

FROM FIG. 21A

| | | |
|---|---|---|
| 15 | 7 THROUGH 0 | TOTAL BYTE COUNT |
| 16 | 7 THROUGH 0 | TBC2 |
| 17 | 7 THROUGH 0 | TBC1 |
| | | TBC0 |
| 18 | 7 THROUGH 0 | PBST | PHYSICAL BLOCK SEQUENCE TAG |
| 19 | 7 | RWEN | RE-WRITE ENABLE |
| | 6 THROUGH 0 | RRWC | REMAINING RE-WRITE COUNT |
| 20 | 7 THROUGH 0 | CDBN | CUMULATIVE DATA BLOCK/BYTE NUMBER (CDBN) |
| 21 | 7 THROUGH 0 | CDBN | |
| 22 | 7 THROUGH 0 | CDBN | |
| 23 | 7 THROUGH 0 | CDBN | |
| 24 | 7 THROUGH 0 | CDBN | |
| 25 | 7 THROUGH 0 | CDBN | |
| 26 | 7 THROUGH 0 | ADFN2 | ABSOLUTE DOUBLE FRAME NUMBER |
| 27 | 7 THROUGH 0 | ADFN1 | |
| 28 | 7 THROUGH 0 | ADFN0 | |
| 29 | 7 THROUGH 4 | PDTY | PHYSICAL BLOCK DOUBLE FRAME TYPE |
| | 3 THROUGH 0 | HTTY | HELICAL TRACK TYPE |
| 30 | 7 | CMPSD | COMPRESSED |
| | 6 | DUB | DUBBED |
| | 5 THROUGH 0 | HTKN | HELICAL TRACK NUMBER |
| 31 | 7 THROUGH 0 | SSCRCI | SUBAREA SUBBLOCK CRC INVERTED |

Fig. 21B

| BYTE NO. | BIT NUMBER | FIELD NAME | COMMENTS |
|---|---|---|---|
| 0 | 7 & 6 | PTLO | PARTITION LAYOUT OPTION |
|  | 5 THROUGH 0 | SZSZ1 | SYSTEM ZONE SIZE |
| 1 | 7 THROUGH 0 | SZSZ0 | |
| 2 | 7 THROUGH 0 | SZSP2 | SYSTEM ZONE SPACING |
| 3 | 7 THROUGH 0 | SZSP1 | |
| 4 | 7 THROUGH 0 | SZSP0 | |
| 5 | 7 THROUGH 0 | PTGAS2 | PARTITION GROUP A SIZE |
| 6 | 7 THROUGH 0 | PTGAS1 | |
| 7 | 7 THROUGH 0 | PTGAS0 | |
| 8 | 7 THROUGH 0 | PTGAC | PARTITION GROUP A COUNT |
| 9 | 7 THROUGH 0 | PTGBS2 | PARTITION GROUP B SIZE |
| 10 | 7 THROUGH 0 | PTGBS1 | |
| 11 | 7 THROUGH 0 | PTGBS0 | |
| 12 | 7 THROUGH 0 | PTGBC | PARTITION GROUP B COUNT |
| 13 | 7 THROUGH 0 | VNDR5 | VENDOR IDENTIFIER |
| 14 | 7 THROUGH 0 | VNDR4 | |
| 15 | 7 THROUGH 0 | VNDR3 | |
| 16 | 7 THROUGH 0 | VNDR2 | |
| 17 | 7 THROUGH 0 | VNDR1 | |
| 18 | 7 THROUGH 0 | VNDR0 | |

FROM FIG. 22A

| | | |
|---|---|---|
| 19 | 7 THROUGH 0 | LAST DOUBLE FRAME NUMBER |
| 20 | 7 THROUGH 0 | LDFN2 |
| 21 | 7 THROUGH 0 | LDFN1 |
| 22 | 7 THROUGH 0 | LDFN0 |
| 23 | 7 THROUGH 0 | LAST VALID SYSTEM ZONE / LVSZ |
| 24 | 7 THROUGH 4 | LAST VALID PARTITION / LVPT0 / LVPT1 |
| | 3 THROUGH 0 | PARTITION GROUP A PHYSICAL BLOCK DOUBLE FRAME TYPE / PGAPD |
| 25 | 7 THROUGH 0 | VOLUME IDENTIFIER / VLID5 |
| 26 | 7 THROUGH 0 | VLID4 |
| 27 | 7 THROUGH 0 | VLID3 |
| 28 | 7 THROUGH 0 | VLID2 |
| 29 | 7 THROUGH 0 | VLID1 |
| 30 | 7 THROUGH 0 | VLID0 |
| 31 | 7 THROUGH 0 | SUBAREA SUBBLOCK CRC INVERTED / SSCRCI |

FIG. 22B

| BYTE NO. | FIELD NAMES | FIELD SIZE (IN BYTES) | COMMENTS |
|---|---|---|---|
| 0 & 1 | NVTE | 2 | NUMBER OF VALID TABLE ENTRIES IN THE PARTITION TABLE |
| 2 | TABLE ENTRIES | N * 8 | UP TO 1,125 ENTRIES WILL BE ALLOWED |
| 9001 | | | |
| 9002 & 9003 | PTCS | 2 | PARTITION TABLE CHECKSUM |

Fig. 24

| BYTE NO. | BIT NUMBER | FIELD NAME | DEFINITION |
|---|---|---|---|
| 0 | 7 THROUGH 0 | | RESERVED AND SHALL BE RECORDED WITH (00)h |
| 1 | 7 THROUGH 0 | SDFN2 | STARTING DOUBLE FRAME NUMBER FOR THE SECTION |
| 2 | 7 THROUGH 0 | SDFN1 | |
| 3 | 7 THROUGH 0 | SDFN0 | |
| 4 | 7, 6, 5 & 4 | | PHYSICAL BLOCK DOUBLE FRAME TYPE |
| 4 | 3, 2, 1 & 0 | PSID1 | PARTITION/SYSTEM-ZONE IDENTIFIER |
| 5 | 7 THROUGH 0 | PSID0 | (SEE 6.2.2.16 FOR DEFINITION) |
| 6 | 7, 6, 5 & 4 | | RESERVED AND SHALL BE RECORDED WITH (0)h |
| 6 | 3, 2, 1 & 0 | TETY | TABLE ENTRY TYPE<br><br>TETY = "1000": BOVF (BEGINNING OF THE FIRST VFI ZONE)<br>TETY = "0100": BOSZ (BEGINNING OF A SYSTEM ZONE)<br>TETY = "0010": BOPT (BEGINNING OF A PARTITION)<br>TETY = "0001": COPT (CONTINUATION OF THE PRECEDING PARTITION)<br>TETY = "0000": A NOT-USED SECTION |
| 7 | 7 THROUGH 0 | PTEC | PARTITION TABLE ENTRY CHECK SUM |

Fig. 25

| BYTE NO. | BIT NUMBER | FIELD NAME | DEFINITION |
|---|---|---|---|
| 0 | 7 THROUGH 0 | LVSZ | LAST VALID SYSTEM ZONE IDENTIFIER |
| 1 | 7 THROUGH 0 | LDFN2 | LAST DOUBLE FRAME NUMBER OF THE VOLUME |
| 2 | 7 THROUGH 0 | LDFN1 | |
| 3 | 7 THROUGH 0 | LDFN0 | |
| 4 | 7, 6, 5 & 4 | | RESERVED AND SHALL BE RECORDED WITH (0)h |
| 4 | 3, 2, 1 & 0 | LVPT1 | LAST VALID PARTITION IDENTIFIER |
| 5 | 7 THROUGH 0 | LVPT0 | |
| 6 | 7, 6, 5 & 4 | | RESERVED AND SHALL BE RECORDED WITH (0)h |
| 6 | 3, 2, 1 & 0 | TETY | TETY = "1111": THE EOV ENTRY |
| 7 | 7 THROUGH 0 | PTEC | PARTITION TABLE ENTRY CHECK SUM |

FIG. 26

| ACRONYM | DESCRIPTION |
| --- | --- |
| ADFN | ABSOLUTE DOUBLE FRAME NUMBER |
| AMB | AMBLE |
| AMB DF | AMBLE DOUBLE FRAME |
| AMDF | AMBLE DOUBLE FRAME |
| BOM | BEGINNING OF MEDIA |
| BOM DF | BEGINNING OF MEDIA DOUBLE FRAME |
| BOP | BEGINNING OF NEXT PARTITION |
| BOPT | BEGINNING OF A PARTITION |
| BOSZ | BEGINNING OF A SYSTEM ZONE |
| BOT | BEGINNING OF TAPE |
| BOVF | BEGINNING OF FIRST VFI ZONE |
| CDBN | CUMULATIVE DATA BLOCK/BYTE NUMBER |
| CMPSD | COMPRESSED |
| COPT | CONTINUATION OF PRECEDING PARTITION |
| CRC | CYCLIC REDUNDANCY CHECK |
| DB/B | DATA BLOCK/BYTE |
| DBN | DATA BLOCK NUMBER |
| DBS | DATA BLOCK SIZE |
| DCSE | DATA BLOCK CHECK SUM ENABLE |
| DF | DOUBLE FRAME |
| DFSM | DOUBLE FRAME SERVO MARK |
| DM | DEMARK |
| DMDF | DEMARK DOUBLE FRAME |
| DPG/V | DATA PATTERN GENERATOR/VERIFIER |
| EEW | EARLY END OF MEDIA WARNING |
| EMW | EARLY END OF MEDIA WARNING |
| EMWF | EARLY END OF MEDIA WARNING FLAG |
| EOF | END OF FILE |
| EOP | END OF PRIOR PARTITION |
| EOR | END OF RECORDING |
| EOR/E | END OF RECORDING/ERROR |
| EOR/T | END OF RECORDING/TEMPORARY |

FROM FIG. 27A

| | |
|---|---|
| EOT | END OF TAPE |
| EOV | END OF VOLUME |
| EVPB | EVEN PARITY BYTE |
| FDBN | FIRST DATA BLOCK/BYTE NUMBER |
| FID | FORMAT IDENTIFIER |
| FSN | FILE SECTION NUMBER |
| HTKN | HELICAL TRACK NUMBER |
| HTTY | HELICAL TRACK TYPE |
| ICRC | INVERTED CRC |
| I/O | INPUT/OUTPUT |
| IPI | INTELLIGENT PERIPHERAL INTERFACE |
| LAT | LOGICAL ADDRESS TRACK |
| LATS | LOGICAL ADDRESS TRACK SEGMENT |
| LDBN | LAST DATA BLOCK/BYTE NUMBER |
| LDFN | LAST DOUBLE FRAME NUMBER OF THE VOLUME |
| LOZ | LOAD OPERATING ZONE |
| LVPT | LAST VALID PARTITION IDENTIFIER |
| LVSZ | LAST VALID SYSTEM ZONE IDENTIFIER |
| NVTE | NUMBER OF VALID TABLE ENTRIES IN THE PARTITION TABLE |
| PAT | PHYSICAL ADDRESS TRACK |
| PATS | PHYSICAL ADDRESS TRACK SEGMENT |
| PB DF | PHYSICAL BLOCK DOUBLE FRAME |
| PBID | PHYSICAL BLOCK IDENTIFIER |
| PBOM | PHYSICAL BEGINNING OF MEDIA |
| PBOT | PHYSICAL BEGINNING OF TAPE |
| PBTY | PHYSICAL BLOCK TYPE |
| PBST | PHYSICAL BLOCK SEQUENCE TAG |
| PDTY | PHYSICAL BLOCK DOUBLE FRAME TYPE |
| PEOM | PHYSICAL END OF MEDIA |
| PEOT | PHYSICAL END OF TAPE |

FROM FIG. 27B

| ACRONYM | DESCRIPTION |
|---------|-------------|
| PGAC | PARTITION GROUP A COUNT |
| PGAPD | PARTITION GROUP A PHYSICAL BLOCK DOUBLE FRAME TYPE |
| PGAS | PARTITION GROUP A SIZE |
| PGBC | PARTITION GROUP B COUNT |
| PGBPD | PARTITION GROUP B PHYSICAL BLOCK DOUBLE FRAME TYPE |
| PGBS | PARTITION GROUP B SIZE |
| PFMT | PRE-FORMATTED |
| PSID | PARTITION/SYSTEM-ZONE IDENTIFIER |
| PTAC | TYPE A PARTITION COUNT |
| PTAS | TYPE A PARTITION SIZE |
| PTBC | TYPE B PARTITION COUNT |
| PTBL | PARTITION TABLE |
| PTBS | TYPE B PARTITION SIZE |
| PTCS | PARTITION TABLE CHECK SUM |
| PTEC | PARTITION TABLE ENTRY CHECK SUM |
| PTGAC | PARTITION GROUP A COUNT |
| PTGAS | PARTITION GROUP A SIZE |
| PTGBC | PARTITION GROUP B COUNT |
| PTGBS | PARTITION GROUP B SIZE |
| PTID | PARTITION IDENTIFIER |
| PTOL | PARTITION LAYOUT OPTION |
| QF | QUAD FRAME |
| QFSM | QUAD FRAME SERVO MARK |
| RRWC | REMAINING REWRITE COUNT |
| RWEN | REWRITE ENABLE |
| SDFN | STARTING DOUBLE FRAME NUMBER |
| SF | SINGLE FRAME |
| SFSM | SINGLE FRAME SERVO MARK |
| SM | SERVO MARK |
| SSCRCI | SUBAREA SUBBLOCK CRC INVERTED |
| SSCS | SUBAREA CRC SUM |
| SVT | SERVO TRACK |
| SVTS | SERVO TRACK SEGMENT |
| SZEN | SYSTEM ZONE |
| SZID | SYSTEM ZONE IDENTIFIER |
| SZSP | SYSTEM ZONE SPACING |
| SZSZ | SYSTEM ZONE SIZE |
| TBC | TOTAL BYTE COUNT |
| TETY | TABLE ENTRY TYPE |
| TP | TRACK PAIR |
| TPSM | TRACK PAIR SERVO MARK |
| TS | TIME STAMP |
| TSDT | TIME STAMP DATA |
| TSTY | TIME STAMP TYPE |
| VFI | VOLUME FORMAT INFORMATION |
| VLID | VOLUME IDENTIFIER |
| VNDR | VENDOR IDENTIFICATION |
| ZNTY | ZONE TYPE |

FIG. 27C

DATA RECORDING SYSTEM AND METHOD HAVING LOGICAL OVERRECORDING CAPABILITY

CROSS-REFERENCE TO RELATED APPLICATIONS

Data Recording System having Demarking Capability and Method, by Lionel Shih, filed Feb. 28, 1992, Ser. No. 07/843,522 now U.S. Pat. No. 5,319,504.

Data Recording System having Unique End-of-Recording and Start-of-Recording Format Indicators, by Tracy Wood and Lionel Shih, filed Feb. 28, 1992, Ser. No. 07/843,585 now U.S. Pat. No. 5,384,668.

Data Tape Recording System having Longitudinal Address and Servo Tracks, by Lionel Shih and Tracy Wood, filed Feb. 28, 1992, Ser. No. 07/843,995, now abandoned.

Data Recording System having Recording Partition Groups, by Lionel Shih, filed Feb. 28, 1992, Ser. No. 07/843,448, now abandoned.

Data Recording System having Improved Bookkeeping Capability, by Lionel Shih and John Haglund, filed Feb. 28, 1992, Ser. No. 07/843,461.

Data Recording System having Improved Automatic Rewrite Capability and Method of Rewriting, by Lionel Shih, filed Feb. 28, 1992, Ser. No. 07/843,449, now U.S. Pat. No. 5,341,376.

Data Recording System having Improved Longitudinal and Helical Search Capability, by Lionel Shih and Jerry Holter, filed Feb. 28, 1992, Ser. No. 07/843,740.

Volume Format Table for Data Recording System, by Lionel Shih, filed Feb. 28, 1992, Ser. No. 07/843,532 now U.S. Pat. No. 5,355,259.

Digital Servo Track Format, by Kurt Hallamasek, filed Feb. 28, 1992, Ser. No. 07/843,511, now U.S. Pat. No. 5,408,368.

Longitudinal Track Format for Data Recording System, by Jeffrey Fincher, Kurt Hallamasek and Keith Kambies, filed Feb. 28, 1992, Ser. No. 07/843,723, now U.S. Pat. No. 5,341,251.

Data Recording System having Unique Nonrecording Detection, by Lionel Shih and Tracy Wood, filed Feb. 28, 1992, Ser. No. 07/843,517, now U.S. Pat. No. 5,335,119.

Triple Orthogonally Interleaved Error Correction System, by Kirk Handley, Donald S. Rhines and William McCoy, filed Jan. 13, 1992, Ser. No. 07/820,737, now U.S. Pat. No. 5,392,299.

FIELD OF THE INVENTION

The present invention relates to mass storage devices, and more particularly, to recording and reproducing apparatus and methods for achieving very high density recording of digital information at very high transfer rates.

BACKGROUND OF THE INVENTION

The market for mass storage devices is growing at what seems to be an ever increasing rate with the sales of high-performance computers penetrating numerous industries ranging from financial institutions to oil exploration companies. The processing power of these high-performance systems, and the data they generate, are increasing faster than the ability of storage devices to keep pace. The problem of data storage and rapid retrieval is particularly pronounced in computational-intensive applications which create huge amounts of data that need to be accessed in seconds rather than minutes, hours or even days.

Magnetic disks remain the preferred media for direct access to frequently used files because of their fast access times. However, because of their high cost per-unit of storage (such as a megabyte) and their limited capacity, magnetic disk recorders are prohibitively expensive and therefore impractical for large-scale data storage. With the advances in magnetic tape technology, tape based systems remain the preferred choice for mass data storage. In addition to cost, magnetic tape exceeds the storage density of any other medium, at least from a volumetric standpoint, because tape is a much thinner medium than, for example, magnetic disks, and tape can be tightly packed. A general discussion of such technology may be found in *Mass Storage Technologies*, by S. Ranada, published in 1991 by Meckler Publishing.

The tape format basically defines the recording path used to record signals on the tape. There are many different recording formats developed for data recording and reproducing. A commonly used format for high capacity systems is IBM's 3480 multi-track tape cartridge format in which the tape transport employs a stationary head and records data along longitudinal tracks. Since the late 1970's rotary head helical scan recorders, a technology developed originally for video recorders, have been used for recording data. In helical scan recorders, the tape is transported past a rapidly rotating head along a helical path whereby data is recorded diagonally across the tape. Compared to longitudinal recorders, helical scan recorders generate high recording densities and lower tape speeds for a given data transfer rate.

SUMMARY OF THE INVENTION

The present invention is directed to a magnetic recording and reproducing system that is particularly suited for helical recorders of the type which utilize cassettes of tape having two hubs and an outer shell, but is not limited to helical recorders or to the use of such cassettes.

However, because of the unique recording format used by the system, the cassettes can be conveniently loaded on and unloaded from the system at any of many positions along the length of tape in the cassette without jeopardizing the integrity of the data recorded on the tape. Because of this functionality, the system can conveniently use cassettes of different sizes and different lengths of tape, and the necessity of rewinding the tape to the beginning of the tape prior to unloading and loading is obviated.

While the system disclosed herein is particularly suited for providing archival recordings of data and may be a backup to a network computer application having a large file server, the system disclosed herein is also suited for use as a near-line library when used in combination with a large computer disc drive with the disc drive interacting with the system to perform frequent and multiple transfers of data between the system and the disc drive. The present system is also particularly suited for a library functionality which may be a repository for multiple disc drives and may use robotics for loading and unloading hundreds if not thousands of cassettes during use. It is particularly advantageous that the system utilizes cassettes having extremely high capacity which may be on the order of $165 \times 10^9$ bytes for large cassettes having maximum tape lengths. The system also exhibits extremely high data transfer rates, i.e., on the order of 15 megabytes per second.

While the system disclosed herein is advantageously suited for use with cassettes of tape, it should be fully understood that the system does not require such cassettes and can be used with reels of tape, albeit not with all of the attendant advantages and desirable features. The format and functionality that is disclosed has applicability to a wide range of recorders and is also not limited to a magnetic recording medium. Many of the desirable attributes of the system are applicable to types of recording other than helical type recording, such as longitudinal recording systems, and many aspects of the present system are definitely not limited to helical type recording and reproducing apparatus and systems.

Also, while the system is described herein as a recording and reproducing system, it should also be understood a machine could be made which could have only the functionality of a recorder or of a playback or reproducing machine. Such limited function machines would severely limit the advantages of a system having both recording and reproducing capabilities, and any cost savings of such limited function machines is not contemplated to be justified in light of the limitations that would result.

More particularly, the present invention is directed to a magnetic recording and reproducing system that has a recording format that records blocks of data of predetermined size as specified by a host or user system and the present system reformats the user data blocks into physical blocks that are recorded on tape, with the physical blocks being recorded in what are referred to herein as double frames. Each double frame is recorded on a set of successive helical tracks, preferably 32 tracks. Each double frame has system format data interleaved with the user data block data which system format data identifies the double frame as being of a particular type.

The system format data provides important information for performing recording and reproducing operations, including the capability of searching for user data blocks, accessing the data blocks for reproducing them, and recording new data at a particular location, among other capabilities.

The system of the present invention records user data in physical blocks of predetermined size, with the user data being identified by files and contained in predetermined size data blocks, a plurality of which can be contained in each physical block. The system records format data with the user data and the format data includes a specified identification number for each data block of user data and a specified identification number for each physical block in which each data block is contained. Successive data blocks having incrementing identification numbers and successive physical blocks having incrementing identification numbers.

In accordance with an important aspect of the present invention, the system performs logical overrecording or partial overwriting, without jeopardizing data that is located before the location of the overwrite, and the new data is formatted in such a way that new physical blocks are written downstream of the original physical blocks containing the originally recorded data blocks. The new physical blocks start with a specific presumably modified data block whereas the original recorded physical blocks may have had the originals of the modified data blocks located anywhere within them. The new physical blocks are recorded downstream of the original physical block so that data blocks in the old physical block that are not intended to be affected, and which could otherwise be lost by an overwriting, are retained. The modified data blocks to be recorded are contained in new physical blocks that are recorded at a location after the physical block that contains some of the original unmodified data blocks.

OBJECTS OF THE INVENTION

It is a general object of the present invention to provide an improved system having the desirable aspects of helical recording on magnetic tape contained in cassettes which is uniquely configured to record digital data utilizing a format that contributes to extremely high capacity recording, reliable recording and reproducing, and reliable searching and access to data that is recorded on the tape.

Yet another object of the present invention is to provide an improved recording and reproducing system which permits logical overrecording of user data blocks in larger system physical blocks which retains previously recorded and unaltered data blocks, and does so while retaining identification data that is recorded with the data blocks that permits the system to subsequently perform reliable and efficient search operations for the user data blocks.

Another object of the present invention is to provide an improved recording and reproducing system which has the capability of recording blocks of user data in larger system defined physical blocks during recording, and which can rewrite modified data blocks within physical blocks without affecting the data blocks that preceded the rewritten data blocks.

Yet another object of the present invention is to provide an improved recording and reproducing system which permits logical overrecording of user data blocks in larger system physical blocks which retains previously recorded and unaltered data blocks.

Other objects and advantages will become apparent upon reading the following detailed description, while referring to the attached drawings.

DESCRIPTION OF THE DRAWINGS

FIG. 1 is a schematic block diagram of the present system shown together with a host system and an intelligent peripheral interface that is located between the host system and the present system;

FIG. 2 is a broad functional block diagram of the system disclosed herein;

FIG. 3 is a schematic diagram illustrating the manner in which user data is organized and the manner in which the system disclosed herein organizes and formats the user data for recording and reproducing by the system;

FIG. 4 is a more detailed functional block diagram of the system disclosed herein;

FIG. 5 schematically illustrates a magnetic tape and format characteristics that are used by an embodiment of the system arranged to record and reproduce information data on magnetic tape;

FIG. 9(a) through FIG. 9(f) are schematic illustrations of sets of recorded double frames that are recorded during various recording operations that can be performed by the system;

FIG. 13 is a schematic illustration of the organization of data that is recorded in each segment of the logical address track (LAT) and physical address track (PAT) shown in FIGS. 7 and 8;

FIG. 14 is a chart showing the type of segment information that is recorded in various logical address track segments and in the various physical address track segments, and illustrating the relationship of the segment information to the type of information that is recorded on the helical recording area;

FIG. 15 illustrates a chart of the information that is recorded in the various types of logical address track segments and physical address track segments;

FIG. 16 is a diagram illustrating the front padding portion of the illustration shown in FIG. 13;

FIG. 17 is a diagram illustrating the rear padding portion of the illustration shown in FIG. 13;

FIGS. 18(a) through 18(d) illustrates waveforms of various synchronization digital information that is recorded on the servo track;

FIG. 19 is a chart illustrating the type of digital information that is recorded at various locations within each servo track segment;

FIG. 20 is a chart illustrating the information that is recorded in the helical track type field (HTTY) at the byte 29 location of the physical block information in FIG. 21;

FIG. 21 is a chart illustrating the physical block information that is recorded in subblocks 0, 2 and 4 of the subarea as shown in FIGS. 11 and 12;

FIG. 22 is a chart illustrating the volume format information that is recorded in subblock 1 of the subarea as shown in FIGS. 11 and 12;

FIG. 23 is a chart illustrating the information that is recorded in the format identifier field (FID) at the byte 0 location of the physical block information in FIG. 21;

FIG. 24 is a chart illustrating the information that is recorded in a volume format table (VFT) located in the VFI zones shown in FIG. 10;

FIG. 25 is a chart illustrating the information that is recorded in a table entry in the volume format table (VFT) shown in FIG. 24;

FIG. 26 is a chart illustrating the information that is recorded in an end of volume (EOV) entry in the volume format table (VFT) shown in FIG. 24;

FIGS. 27(a) and 27(b) comprises a glossary of terms and acronyms, together with a brief description of them, used herein to describe the methods and apparatus.

DETAILED DESCRIPTION OF THE INVENTION

Broad Overview of the System

Figure 6:
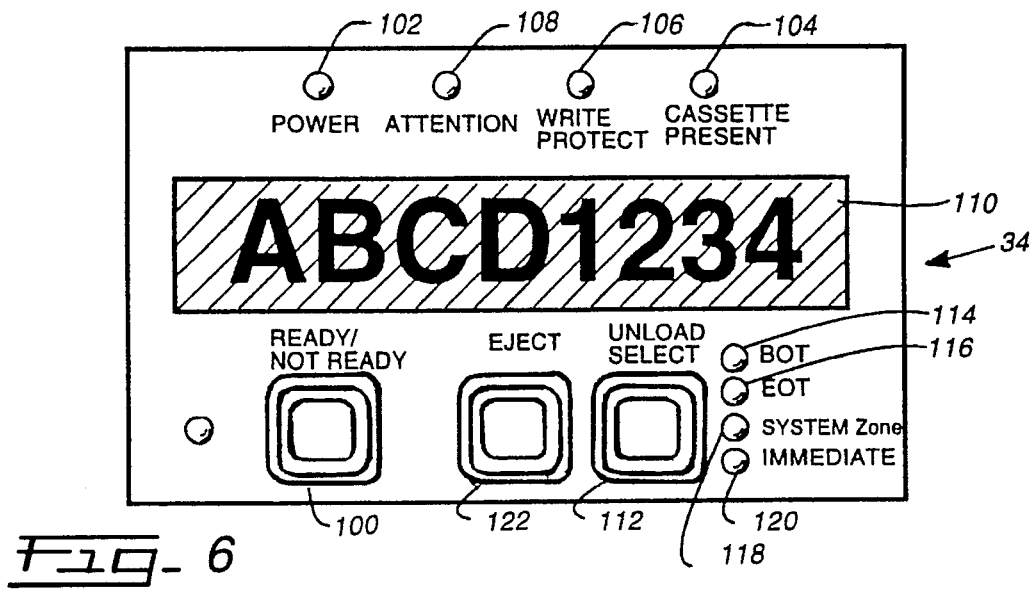
FIG. 6 is a front elevation of the manual operator control panel of the system disclosed herein.

While the present invention will be specifically described in connection with a rotary head helical scan tape recording apparatus, it is equally applicable to other types of recording apparatus, such as a disk recorder or a longitudinal or quadruples-type tape recorder. Additionally, while the present invention will be described in conjunction with the recording and reproducing of information on magnetic tape with the use of electromagnetic transducing heads, the present invention is also applicable to optical recorders or the like using appropriate transducers and recording mediums.

It should also be understood that the present invention is applicable to arrangements where the rotating record and/or reproduce head can move in either rotational direction, where the tape can be introduced to the helical path either above or below the exit point from the path and where the tape can be transported about the helical path in either direction.

The system or apparatus disclosed herein can also be referred to as a data storage peripheral that is a high speed, high density helical scan tape recording and reproducing device that is designed to be operated in a master/slave environment as defined by the Intelligent Peripheral Interface (IPI) standards, such as ANSI X3.147-1988 (ANSI is the American National Standard Institute) and ANSI X3T9/88-82, Revision 2.1, Jan. 3, 1989. The system provides the functionality of an IPI-3 slave, as illustrated in FIG. 1.

The system, indicated generally at 20, is an addressable entity under control of and is connected to an IPI master 22 that is resident in a host system 24. The host system IPI master 22, which is not described herein, is responsible for managing the system 20 as well as other IPI slaves in accordance with the capabilities thereof and is responsible for controlling the IPI interface.

Referring to the broad functional block diagram of FIG. 2, the system 20 has the capability to accept commands and data from and transfer responses and data to the host system 24 (FIG. 1) connected to a computer interface port 26 and the system 20 has a cassette interface 28 through which tape cassettes 30 having tape loaded thereon can be accepted and ejected. When a cassette is inserted into the cassette interface 28, the system automatically loads the cassettes by positioning the cassette over the capstan hubs, thereafter extracting tape from the cassette and threading it over the longitudinal read/write heads (not shown). When necessary, the tape is also threaded over the rotatable read and write heads that record data on and reproduce data from tracks that extend diagonally across the tape as it is transported about a cylindrical guide drum. The rotatable heads and tape guide are commonly in an assembly referred to as a scanner, which is functionally illustrated at 32.

The structure of the scanner 32 shown functionally as well as the cassette interface 28, which are functionally illustrated in FIG. 2, are not in and of themselves part of the present invention, but are known in the art. The scanner includes a pair of axially displaced drum sections, one of which is stationary and the other rotatable. The rotatable drum section has four orthogonally located read heads positioned on its outer periphery, with four write heads located immediately adjacent thereto. The read heads are mounted on electromechanical bender elements so that they can be laterally positioned relative to a track to more accurately follow the track during reproducing and to locate the heads on a track adjacent a track that would be recorded by the write head during recording so as to obtain the data immediately after it has been written for the purpose of verifying that the data has been accurately recorded. Details of the scanner are described in Ampex D2 VTR manual, which is specifically incorporated by reference herein.

When commanded to eject a cassette, the system unthreads the tape from the helical scanner if it had been threaded over the same, and also unthreads the tape from the longitudinal heads and retracks the tape back into the cassette which is then ejected from the cassette interface 28.

The system includes a manual interface 34 that contains switches and indicators necessary for an operator to power on and configure the system and also contains controls and indicators that are necessary for an operator to manually initiate loading and ejecting a cassette. The cassette interface 28 allows tape cassettes to be inserted in and removed from the system 20. The cassette interface is located in the front of the system. The cassette interface 28 provides the capability to accept small, medium and large D-type tape cassette sizes as specified in the Society of Motion Picture and Television Engineers (SMPTE) 226M standard.

A control function block 36 controls the operation of the system and it is shown to have lines 38 for connecting to an auxiliary interface that is primarily used to execute diagnostic test sequences and predefined self-tests. The control function 36 is connected to a format function block 42 that formats the data received from the computer interface port and is directed to an encoding function block 44 for encoding and subsequent recording on the tape. Also, data recovered during reproducing is applied to a decode function block 46 that decodes the data, applies it to the format function block 42 for transfer to the host system 24 via the computer interface port 26. Commands received by the system 20 from the host system 24 are input through the computer interface port 26 and are routed to the control function 36 for processing and subsequent execution.

In accordance with an important aspect of the system, it accepts user data from the host system 24 in an organizational data structure defined by the host system, and the system disclosed herein formats the user data in a manner that enables the data to be recorded on and reproduced from tape using a format that enables effective fast access to data and which facilitates very high data transfer rates as well as very high data capacities. The manner in which the system interacts with a host system supplying user data can be more easily understood by referring to FIG. 3 which shows the user view constructs to the left of a reference line 50 with the recording media view constructs being shown to the right of the line 50.

Referring initially to the user view of the data, the user or host system generally has data contained in file sets which may include one or more files 52, with each of the files having one or more file sections 54. Each of the file sections 54 may have a large number of data blocks 56 in them with the data blocks having a size that is determined by the user or host system and which may comprise a convenient amount of data which is formatted by the system 20 for recording. The present system 20 will support data blocks 56 having as few as 80 8-bit bytes, up to approximately 1 million bytes. The system 20 receives the data blocks 56 and organizes them into physical blocks 58 of data and the physical blocks are recorded in one or more partitions 60 located on the tape with the partitions being located in a volume 62 that may be part of a volume set. However, each volume 62 represents a single cassette of tape.

During the recording of user data, user data blocks are formatted into physical blocks by the system 20. Depending upon the size of the data blocks, which may not exceed the amount of data that is contained in a physical block, i.e., only complete data blocks can be contained in physical blocks and a data block cannot extend over more than one physical block, there may be a number of data blocks contained in a physical block. The system supports up to 1,199,840 bytes of user data block data in a physical block.

In accordance with another aspect of the present system, the units or physical blocks 58 that are recorded by the system 20 are defined by the system to be of a predetermined size and that size is recorded and reproduced by the system in units that are defined as double frames. While there are various types of double frames, as will be described, the size of all of the types of double frames are the same and are recorded on a helical recording area by the scanner 32 during recording. Each double frame consists of a set of consecutive helical tracks, with the set preferably comprising 32 helical tracks. Given the fact that whole user data blocks 56 must be formatted into physical blocks, and the size of the user data blocks are user defined and can be different, it should be evident that the amount of data in integer numbers of whole data blocks that can be grouped into a physical block may not complete the entire 1,199,840 bytes of the physical block. In such event, the system 20 pads out the physical block with bytes of filler data in order to reach the total capacity of the physical block.

With the above format discussion in mind, a physical block is fully defined by seven recorded parameters which are used to identify the user data that is recorded and reproduced by the system 20 in its format. These parameters include a file section number (FSN), a first data block number (FDBN), the cumulative data block number (CDBN), a data block/byte identification (DB/B), a data block check sum enabled indication (DCSE), a data block size (DBS) and a total byte count (TBC).

With respect to the above, the file section number will identify the file section of data which is located in the physical block and each file section may span many physical blocks. The first data block number (FDBN) identifies the ordinal number of the first data block number of a physical block in a file section which is being recorded. The cumulative data block number represents the ordinal number of the first data block or first user data byte of a physical block counting from the first data block of a partition. The data block/byte indication merely refers to whether the data is organized into files or not. Since the system 20 is also useful as an instrumentation recorder which may have a continuing stream of data that is to be recorded with no logical boundaries in the data, the use of a predetermined number of bytes is also supported by the system. The data block size is defined by the host or user system 24 and as previously mentioned, can be a size that is up to the total capacity of the physical block which is 1,199,840 bytes. In the present system, physical blocks are of one size and are recorded by the system on 32 successive helical tracks, with the physical block data being recorded as double frames of data.

In accordance with another important aspect of the format that is used by the system 20, there are several different types of double frames, with the type of double frame being recorded with the user data. It is also an important attribute of the system that the system record the user data with the tape moving during the recording process. The system does not stop the tape to re-record a physical block that may have failed the read-while-write verification criteria of the system. Rather, if during the recording process, a recorded track is reproduced and found unacceptable when subjected to an error analysis, the system records that same physical block downstream on the tape, and depending upon how early the verification failure was determined, will invalidate any inaccurate physical block and possibly the following physical block, and will rewrite, i.e., rerecord the invalidated physical block and possibly the following one. The subsequent physical block can be recorded only if the preceding physical block is successfully recorded.

More particularly, the format of the types and use of double frames by the system include seven types, each of which have format data associated with the double frame that uniquely identifies it as a double frame of that type. The seven types include: (1) a BOM double frame which is used in the beginning of a partition on tape; (2) a physical block double frame (PB DF) which is used to record user data in the physical block form, and system format information; (3) an end of recording/temporary double frame (EOR/T) which is used to identify a temporary and successful end of recording; (4) an end of recording/error (EOR/E) which is used to identify a failed write, i.e., a previously recorded physical block was checked for errors and did not satisfy the verification criteria; (5) an end of recording double frame (EOR) which is used as a logical file mark which indicates the end of a successful recording of file marks; (6) a demark double frame (DMDF) which is used to indicate that the preceding physical block double frame has failed verification criteria; and, (7) an amble double frame (AMDF) which is used to begin a recording, particularly one in which a gap is desired between old and new recording to prevent damage to existing data. The use of the various types of double frames greatly contribute to the powerful functionality of the system as will be described.

Detailed Functional Block Diagram of the System

While the system has been broadly described with respect to the broad functional block diagram of FIG. 2, the system will now be described in more detail in connection with the detailed functional block diagram shown in FIG. 4. The system 20 provides the capability of recording or writing data on a tape at a specified address that can be selected by the host system 24. The system 20 accepts data blocks from the host system 24 across one of the computer interface ports, such as the port 26 shown in FIG. 2, and the interface ports are connected to an interface selector function block 70. While a second computer interface can be optionally provided, the selector interface function block is provided to route data across one of multiple computer interface ports to a data formatting function block 72. The data is then applied to an encode/decode function block 74 where the data is preferably encoded with a C1, C2 and C3 error correction code so that errors can be detected and corrected during a subsequent reproducing operation. The C1, C2 and C3 error correction code is not described herein, but is fully described in the above cross-referenced related application of Kirk Handley, Donald S. Rhines and William McCoy, entitled Triple Orthogonally Interleaved Error Correction System, Ser. No. 07/820,737, filed Jan. 13, 1992, now U.S. Pat. No. 5,392,299, which is specifically incorporated by reference herein.

The data format function block 72 also includes a data buffer for the physical block data and it has the capability of buffering a minimum of 48 formatted physical blocks. The data format function block 72 manages the buffer in a way which anticipates that there will be buffer underruns and buffer overruns. The data format function block 72 accepts one or more data blocks depending upon the size of the data blocks which is specified by the host system and which can range from 80 bytes to 1,199,840 bytes. Obviously, the larger the data blocks, the fewer can be fit into a physical block. The data formatting function 72 formats the data blocks into fixed size physical blocks and only an integer number of data blocks are contained in a physical block, since a data block cannot span a physical block boundary. If necessary, the data formatting function 72 inserts fill data into the physical block to complete the required physical block format size. During a recording or write operation, the data formatting function 72 transfers formatted physical blocks to the encode/decode function block 74 but retains a given physical block in the buffer until such time as the encode/decode function 74 indicates that the physical block was correctly written on tape.

During a read or reproducing operation, the data format function block 72 accepts physical blocks from the encode/decode function block 74 and discards any fill data that was inserted into the physical block during a recording operation. The data format function block 72 reconstructs the original data blocks from the formatted physical blocks. The data formatting function 72 uses the physical block buffer to perform exact logical positioning to a specified data block number address. The data formatting function 72 then transfers the data blocks to the interface selector function block 70.

During recording the encoded data is then transferred from the encode/decode function block 74 to a read-while-write function block 76 which enables the system to support a rewrite or re-recording capability in the event that an unacceptable number of errors are detected. The read-while-write function block 76 necessarily decodes the data that is reproduced to determine if the data written on the tape passes verification criteria. If an unacceptable error level is detected, the read-while-write function block 76 causes the original double frame to be rewritten on the tape. The system has read channels for transferring the data recovered during reproducing and write channels for transferring the data for recording on tape.

The read-while-write function block 76 analyzes the data read from the helical tracks to determine if a physical block needs to be rewritten. During a write operation, the read-while-write function block 76 accepts encoded data from the encode/decode function 74 on the write channels while simultaneously accepting encoded data from the channel formatting function block 78 on the read channels and buffered by the read-while-write function block 76. The block 76 retains a physical block until such time that the data has been written on tape, thereafter read from tape and analyzed to determine if it passes the verification criteria. The read-while-write function block 76 then initiates a rewrite operation by interrupting the logical sequence of writing, but not tape motion, and rewriting the entire physical block using the original buffered data.

If the rewritten physical block does not pass the criteria, it will be rewritten again until it is successfully written, but only attempts a maximum of 20 rewrites, with the number being adjustable by the host system between zero and 20. If the read-while-write function block 76 exhausts the rewrite attempt threshold, the write operation is then terminated and a permanent write error is declared. During a read or reproducing operation, the read-while-write function block 76 is disabled in that the encoded data received from the channel formatting function block 78 on the read channel is transferred directly to the encode/decode function block 74 on the read channel. The read-while-write function block accepts control information from and transfers status information to a process control function block 84.

The data from the read-while-write function block 76 is then applied to a channel format function block 78 which reformats the encoded data and adds synchronizing data. The data from the channel format function block 78 is then applied to a data I/O function block 80 writes the serial data on tape. The data I/O function block 80 also simultaneously reads the serial data from the tape in order to support a rewrite capability, and it does so by reformatting the serial data into the encoded serial channel data and sends it to the read-while-write function block 76. The read-while-write function block decodes the recovered data to determine if the data written on the tape is acceptable.

During a write operation, the data I/O function block 80 accepts an encoded serial data stream from the channel formatting function block 78 on the write channels, while simultaneously accepting data from the helical scanner and transferring the data to the channel formatting function 78 on the read channels. The data I/O function provides line equalization and it also provides the helical scanner subsystem, including the record amplifiers, play preamplifiers, and channel equalizers that are necessary to transfer data signals to the write heads and accept data signals from the read heads. Activation and deactivation of the write and read heads is also controlled by the data I/O function block 80. It provides the capability to activate the read heads during a write operation, to support the read-while-write and the rewrite capability. During a read and write operation, the data I/O function 80 accepts data from the helical scanner read heads and transfers the data to the channel formatting function 78 on the read channels. The rotation of the rotatable heads and transport of tape are controlled such that the scanner rotation opposes the direction of tape transport during normal write and read operations and it accepts control information and transfers status information to the transport control function 90.

The channel format function block 78 accepts encoded parallel data during a write operation from the read-while-write function block 76 on the write channels while simultaneously accepting encoded serial data from the data I/O function 80 on the read channels. The channel formatting function block 78 inserts synchronization sequences and other sequences. The channel format function block 78 converts the parallel data into a serial data stream, and preferably encodes the serial data stream in accordance with the Miller-Squared encoding rules to favorably shape the record data spectrum. The Miller-Squared encoding rules are wellknown in the art and are also disclosed in U.S. Pat. No. Re. 31,311, assigned to the same assignee as the present invention.

The channel formatting function block 78 then transfers the encoded serial data stream to the data I/O function block 80 on the write channels. During a read and write operation, the channel formatting function accepts encoded serial data stream from the data I/O function 80 on the read channels. It then provides line equalization for the serial data stream and any necessary control signals. The channel formatting function then decodes the Miller-Squared channel code to NRZ data and detects the synchronization sequences. It then converts the serial data stream into the original parallel data format. It uses the detected synchronization sequences to identify the components of the tape format and removes the synchronization sequences and other sequences from the parallel data. The channel formatting function block then transfers the encoded parallel data to the read-while-write function block 76 on the read channels. It accepts control information and transfers status information to the process control function 84.

A reference generator block 82 provides the timing control reference signals to support the control of the data flow together with servo controlled subsystems of the system. A process control function block 84 provides overall control of the encode/decode function block 74, the read-while-write function block 76 and the channel formatting function block 78 as well as the reference generator function block 82. The process control function block 84 transfers control information to and accepts status information from the encode/decode function block 74, the read-while-write function block 76, the channel formatting function block 78, the reference generator function block 82 and a transport control function block 90. It also accepts commands from and transfers responses to the control function block 36.

The system 20 provides the capability of reproducing data from the tape at a host system specified address and does so by positioning the tape to a specified location and begins reading the data from the tape via the data I/O function block 80. The encoded data is then decoded by the encode/decode function block 74 and errors are corrected within the capability of the C1, C2 and C3 error correction code. If an encode/decode function block 74 error level threshold is exceeded, the system 20 re-reads the data. The decoded physical block data is then reformatted back into the original data blocks by the data formatting function 72 and sent to the host system 20 across the computer interface port 26.

The system 20 provides the capability of accepting a tape cassette when inserted into the cassette interface 28. A cassette handler function block 86 puts the tape cassette into the system and physically positions the cassette over its capstan hubs. A tape handler function block 87 extracts the tape from the cassette and threads it over longitudinal read/write heads and the rotatable read/write heads which are located within a longitudinal track function block 88 and the data I/O function block 80, respectively. The tape handler function block 87 includes servo controlled subsystems necessary to protect and control the tape and the rotatable head motion. It includes a read/write head rotation servo subsystem that phase locks the motion of the head drum to a reference provided by the reference generator function block 82.

The head rotation servo subsystem controls the helical scanner such that it maintains a steady state rotation speed during normal write and read operations. The head rotation servo subsystem provides rotational position information, with respect to the read and write heads, for proper commutation of the signals transferred to and from the read and write heads. The tape handler function block 87 includes a capstan/reel motor servo subsystem to insure proper tension of the tape and that subsystem dynamically positions the tape in a linear manner based upon control signals received from the reference generation function block 82 and control information received from the transport control function block 90.

The capstan reel motor servo subsystem provides the capability to dynamically position the tape at various system defined speeds, including (1) pre-striped speed, (2) shuttle speed, (3) a longitudinal search speed, (4) a helical search speed, (5) a write speed, and (6) a read speed. The capstan reel motor servo subsystem provides a control means of transitions between different tape speeds and supports positioning based upon tape footage, physical address and logical address data. The tape handler function block 87 includes a thread/unthread servo subsystem to extract tape from a cassette and it also supports the function of retracting the tape into a cassette. The thread/unthread servo subsystem physically positions the tape in the tape guide path for tape motion preparation. It also supports two physical tape path configurations (1) a load configuration where the tape is physically positioned over the longitudinal heads and not the rotatable heads, and (2) a thread operation where the tape is physically positioned over the longitudinal heads and is wrapped around the cylindrical tape guide of the scanner. The tape handler function block 87 performs servo control of the lateral position of the rotatable read head relative to the diagonal tracks to compensate for track pitch variations.

The cassette handler function block 86 comprises the electro-mechanical subsystem necessary to accept, physically position and eject the tape cassettes. It senses the presence of a tape cassette inserted into the cassette interface. The cassette handler function block 86 determines the tape cassette size and it also identifies the tape cassette configuration based on the tape cassette holding holes. By accepting a tape cassette, the cassette handler function block unlocks and opens the cassette lid and physically positions the tape cassette on the capstan/reel motor servo subsystem. Upon ejecting a tape cassette, the cassette handler function block 86 closes and locks the cassette lid and physically removes the tape cassette from the capstan reel motor servo subsystem. The cassette handler function block accepts control information from and transfers status information to the transport control function block 90.

The longitudinal track function block 88 processes the information that is written to and read from three longitudinal tracks of the tape. The longitudinal track function block 88 supplies the information from the longitudinal tracks to facilitate the dynamic positioning of the tape, including searching for various physical and logical address parameters. As will be comprehensively set forth herein, physical address parameters relate to discrete positions on the tape whereas logical address parameters relate to the data that is recorded on the tape. The longitudinal track function block 88 provides the capability to independently activate and deactivate each of the three longitudinal track heads. The longitudinal track function block 88 writes the necessary control information in accordance with the system format criteria in the longitudinal servo control track during a write operation and/or a pre-format operation. The system 20 does not overwrite previously written control information located in the longitudinal servo control track if the tape was preformatted or prestriped. During a position or search operation, the longitudinal track function block 88 provides the longitudinal servo control track information to the tape handler function block 87 for position and velocity feedback. It accepts control information from and transfers status information to the transport control function 90.

Tape position control information is written to and written from the longitudinal tracks by the longitudinal track function block 88. The transport control function block 90 provides overall control of the cassette and the tape during all operations and the manual interface 34 is used to provide operator controlled manual operation of the system 20. The transport control function block 90 transfers control information to and accepts status information from the data I/O function block 80, the tape handler function block 87, the cassette handler function block 86 and the longitudinal track function block 88. It also accepts commands from and transfers responses to the processing control function 84. It also provides an interface to the manual interface 34. The transport control function block 90 does not perform any operation in response to a command received from the manual interface 34 other than formatting and transferring the command to the control function block 36 via the processing control function block 84.

A data pattern generator/verifier function block 94 is provided to generate and/or accept downloaded data blocks which are normally routed through the interface selector function block 70 to the blocks 72, 74, 76, 78 and 80, in order to simulate write operations. The function block 94 has the capability of accepting "loop back" data blocks that have been processed through the system and compare the "loop back" data blocks to the original data blocks to confirm proper operation.

The control function block 36 provides overall control of the system 20. It has the capability of accepting commands from and transfer responses to the host system 20 connected to the computer interface port 26 and/or the auxiliary interface and provides the capability of accepting commands from and transfer an appropriate response to the manual interface 34 via the processing control function block 84 and the transport control function block 90. Upon receipt of a command, the control function block 36 interprets the command and performs the functions necessary to execute it. The control function block 36 also provides the capability to enable and disable each computer interface port, such as interface port 26. It also provides the capability of queuing commands from the host system 20 which it processes the order in which the commands were received. It also maintains accumulated operational status history data in a nonvolatile memory which may be accessed for system analysis.

The manual interface 34 will be functionally described in connection with FIG. 6 which illustrates the operator visible manual interface that is physically located on the front of the system 20. The manual interface 34 contains a manual ready/not ready control switch 100, which if in the ready mode, permits the system to enable the computer interface port 26, disable the manual interface controls except for the ready/not ready control. If the control switch 100 is in the not ready mode, the system 20 disables the computer interface port 26, enables the manual interface controls and accepts all commands across the auxiliary interface. The control switch 100 does not require electrical power for its state to be changed. The interface 34 includes a ready status indicator 102 which indicates whether the system is ready or not ready. Another indicator 104 indicates when a cassette is loaded in the system 20. A write protect indicator 106 provides an indication whether the tape cassette is write protected and is on if the cassette is write protected. An attention indicator 108 provides an indication if there has been a failure detected. Additionally, a message display 110 is provided which has the capability to display a minimum of eight alphanumeric characters which relate to various operating status conditions and commands. The manual interface 34 also contains a manual unload select control 112 which provides the capability for an operator to select one of four tape unload positions which are identified by indicators 114, 116, 118 and 120. The BOT indicator 114 signifies an operating mode in which the cassette will be rewound to the beginning of tape before it is unloaded. The EOT indicator 116 signifies an operating mode in which the tape is wound to the end of tape before it is ejected. The system zone indicator 118 signifies an operating mode in which the tape is wound to the nearest system zone where it is stopped and the cassette ejected. The immediate eject indicator 120 signifies an operating mode in which the cassette is ejected without winding the tape to a predetermined position. Operating the switch 112 will sequence among these four possibilities and pressing an eject switch 122 will result in the cassette being ejected at the appropriate tape position associated with the operating mode selected.

System Format Overview

Each tape of a cassette, when utilized in the system, has common physical and logical parameters associated with it for performing recording and reproducing operations in the system. Referring to FIG. 5, the format of the tape is illustrated and it has a transparent leader 130 located on each end, and a section at the beginning of the tape that is identified as a BOT section as shown. To the right of the left portion 132 of the beginning of tape section is a physical location of tape mark 134 (PBOT) that identifies the beginning of the magnetic recording surface.

After the PBOT location, a beginning of tape zone 136 is established in which data relating to format considerations is recorded. After the BOT zone 136, a physical beginning of media mark 138 (PBOM) is established which identifies the first location in which recording of volume format information 140 is permitted. After the volume format information, a beginning of media mark 142 (BOM) is established which identifies the area of the tape after which user data can be recorded. Thereafter, files of user data can be recorded, such as at 144 and 146, which can cover a substantial length of tape.

In the lower portion of FIG. 5, there are logical and physical parameters relating to the end of the tape and they include an end of media mark 148 (EOM), a physical end of media location 150 (PEOM), which identifies the location on tape in which recording of user data has to stop. An end of tape section 152 (EOT) is identified and an end of tape zone 154 is used for loading and unloading tape. A physical end of tape location 156 (PEOT) identifies the last portion of the magnetic tape.

The tape may have one or more system zones 158 located along the length of tape in the cassette and the system zones are provided to enable loading and unloading of the cassette at location other than the beginning of tape or the end of tape. It should be understood that with the extremely high data rates that are accomplished by the system, data recorded on tape may be vulnerable to damage by the threading and unthreading operation of a tape when it is loaded into the system. The system zones are provided to have a length of tape where user data is not recorded so that the system can position the tape within the cassette with the system zone spanning the tape path defined by the transport during loading and unloading. Also, the tape comprises a volume which may be divided into a number of smaller volumes and these are defined herein as partitions in which recording and reproducing can be done.

Broadly stated, the use of partitions enables a very long tape to be effectively divided into a number of recordable areas and recording and reproducing can be accomplished in each of the partitions as desired, and therefore support added recording of information data including user data within each partition without affecting the recordings that may be located upstream or downstream of the subject partition. Near the end of the tape is an end of media warning indication 160 (EMW) and that is preceded by an early end of media warning or EEW indication 162. The end of media warning is a predetermined number of double frames prior to the end of media location 148 and are calculated for each partition. The EEW may be set by the host system 24.

Figure 10:
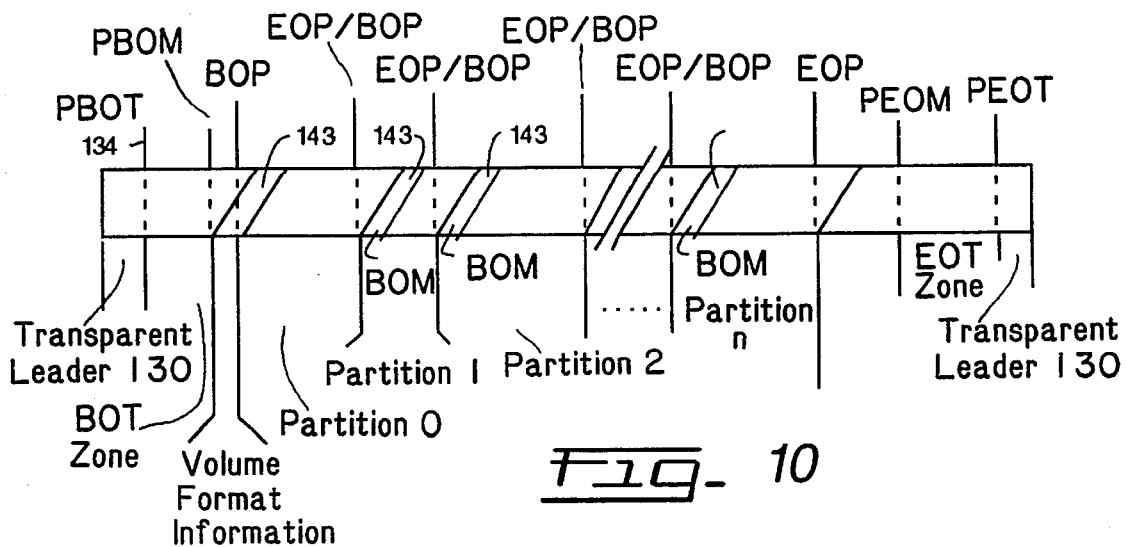
FIG. 10 is a schematic illustration of a tape, with portions removed, and illustrating the location of partitions formatted on the tape.

The relationships of the partitions are also shown in FIG. 10 which illustrates a complete tape having a number of partitions n, and each partition has an address that identifies the end of the prior partition (EOP) which is at the interface of the last double frame and the beginning of the next partition (BOP) which is the next double frame. Each partition will have the EMW and EOM locations identified and preferably the end of media mark (EOM) indication is the three double frames before the end of partition and the EMW warning location is preferably 10 double frames before the end of the partition.

Also, within each partition, there is the BOM zone 143 which preferably comprises 25 double frames of information which includes volume format information for the partition as well as synchronizing information for it. The EEW and EMW marks are calculated locations which impose constraints on the recording that is being done within a partition, and readies the system to end any recording being done within that partition, since physical blocks cannot be incompletely recorded within a partition and therefore cannot span from one partition to another.

With respect to the format that is used to record information on the tape, and referring to FIG. 7, the tape shown has a helical recording area 170 of tracks that extend across the tape diagonally to its length in which the rotatable heads record and reproduce information data including user data and system format data as will be described. Also there are three recording areas, each having a track extending longitudinally along the length of the tape. These include a logical address track 172, a physical address track 174, and a servo track 176. The logical address track is for recording address data relating to the physical blocks and user data blocks that are recorded on tape. The physical address track 174 is for recording data which identifies the double frames that are recorded in the helical area as well as other information, but it does not identify the logical information or information relating to the identity of the data that is recorded in the helical area. It can be analogized to a tape counter function, albeit an extremely sophisticated one. The servo track 176 is for recording servo information for use by the tape servo system for controlling the relative head to tape position and velocity, and provides sophisticated digitally recorded servo marks as well as information which identifies the start of a double frame and of specific subportions of each double frame.

System Zones

The system 20 provides maximum data integrity by using system zones which are fixed length areas along the length of tape, preferably occurring at regular intervals which are reserved for system use. By utilizing these zones, as previously described, the system can support the implementation of nonbeginning of tape loading and unloading and avoidance of user data areas during the threading and unthreading of the tape that occurs during the loading and unloading operations. Such threading and unthreading of tape around a helical scanner has the potential for damaging a recorded area, either by stretching or by poorly controlled contact with the rotating heads of the scanner. Since tape deformations can be temporary, the potential exists for data recorded over an area soon after an unthread operation to subsequently become unreadable when the tape returns to shape.

Such fixed system zones are dedicated to such mechanical operations and helical recording is not performed within the zones, but the longitudinal tracks in these zones are recorded. It is preferred that the system support the location of the system zones at fixed locations for each size of cassette, so that upon reuse of a cassette, which may occur after bulk degaussing, for example, the system zones are at the same longitudinal locations along the tape during subsequent use of the cassette. While the smallest commercial tape length may have no system zones, the larger cassettes with their increased length tape capacities may have several zones. It is preferred that a small tape cassette may have three recording sections, i.e., two interior system zones, a medium cassette have six recording sections and a large cassette have 12 recording sections separated by 11 system zones. It is contemplated that each of the zones be approximately one meter in length, but which can also vary depending upon the length of the tape in the cassette.

In the system zone, there are two subzones, one of which is the load operation zone (LOZ) and the other of which is the volume format information zone (VFI). In the load operation zone there is no recording performed in the helical recording area by the helical scanner, but the longitudinal tracks are recorded in this zone. The VFI zone is identical to that shown after the beginning of tape (BOT) zone which comprises the 25 double frames of VFI information. The reasons that the VFI zone is located downstream or in the forward direction of the load operation zone in each system zone is that if a cassette is loaded on the system, at a location other than the beginning of tape, then the tape can be moved forwardly to obtain the VFI information which tells the system of the format of the tape for operational purposes.

The format allows for some speed variation, i.e., on the order of 0.2%, and the speed between different physical systems may vary significantly for the reason that the speed is a function of the amount of tape in a cassette. For small tapes, it is recommended that the load operation zone consist of approximately 225 double frames. A medium cassette preferably has load operation zones consisting of approximately 411 double frames and a large cassette preferably has load operation zones of approximately 754 double frames. Also the last two double frames in the VFI zone of a system zone can be converted to amble double frames for the purpose of providing a gapped append type of recording, if desired.

If a VFI volume format table is not recorded by the system, then the entire 25 double frames of the VFI zone are recorded as amble double frames. The subarea data of such amber double frame is recorded on preferably every helical track and it contains VFI data containing the same type of information recorded in the VFI table. If the VFT table is recorded, the 25 double frames are recorded as physical block double frames, but the last two can be converted to amble double frames. The information in the VFT is repeated 128 times in each physical block of the 23 or 25 double frames in the VFI zone.

System Partitions

The beginning of partition is a location on tape that denotes the physical beginning of a partition while the BOM is a recorded entity that identifies the logical beginning of a partition in a volume. A BOM will consist of 25 consecutive recorded BOM double frames. The first track of the first BOM double frame of a BOM is the BOP.

The partitions can be defined in terms of two groups of partitions. Each group can have a different size and a different count of partitions. One group can have several small partitions followed by the second group having several large partitions or visa versa, and these two groups are then replicated throughout the tape volume. The partition sizes are effectively transparent to a host system because the host system merely accesses partitions by partition number and is not concerned with the size of the individual partitions that it accesses. The partition information is located in subblock 1 of the subarea data illustrated in FIG. 22.

There are two different size partitions that are supported by the system and are defined as partition group A and partition group B with each group having a predetermined size and a count of the number of partitions. A tape is partitioned by recording the partitions by first establishing the number of partitions specified in group A followed by those in group B and thereafter group A and group B are alternated until the volume of the tape has been fully partitioned. In the event that a volume partition table is utilized and if it cannot be represented in the form of a VFT table, then the fields in the volume format information of subblock 1 of the subarea data is set to zero.

Helical Subarea Matrix

In accordance with an important aspect of the present system, the diagonal or helical tracks that are recorded in the helical area 170 of the tape include physical blocks of user data, and also include system format information which is used by the system to perform necessary operations. While it is preferred that the system format information be included on every helical track of each double frame, it is possible to write the information on some lesser number of tracks. Since each physical block is written as a double frame of data on 32 helical tracks, the system format information relating to the physical block and to the system is recorded 32 times for each double frame.

While the information for each helical track changes as will become evident, the system format information is always present. It should also be understood that the system format information is encoded with the user data recorded on the helical tracks so that it is interleaved with the user data along the entire length of each of the tracks. However, the system format information comprises a small quantity of information relative to the user data that is being recorded.

Figure 11:
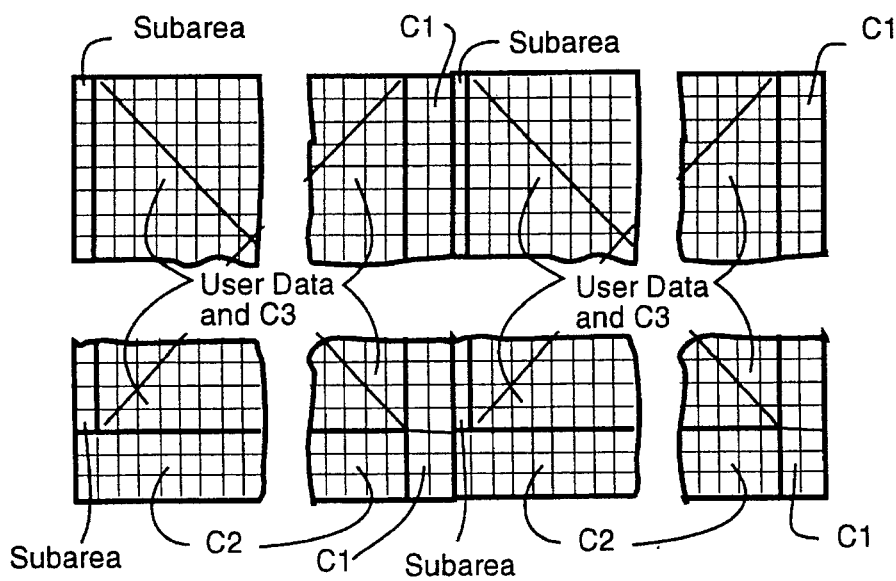
FIG. 11 is an illustration of the organization of data that is recorded in the helical recording area of a tape.
Figure 12:
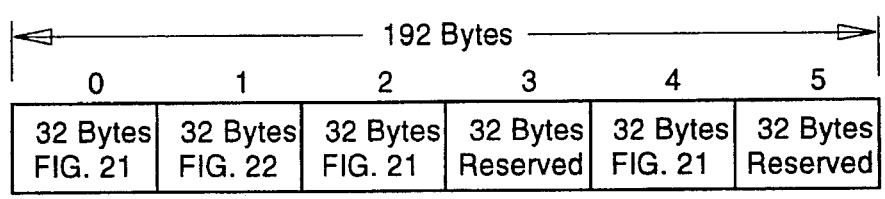
FIG. 12 is a chart illustrating the organization of the subarea section used to record system format data shown in FIG. 11.

More particularly, and referring initially to FIGS. 11 and 12, FIG. 11 illustrates a matrix of data with each small square representing a byte of data. The data of each track comprises user data in the area as shown and occupies the bulk of the total data that is written on a track. The matrix also includes a subarea as shown, in which 192 bytes of system format information is contained. The remainder of the data is C1 type error correction code data and also C2 type error correction data. The C1 and C2 areas are illustrative and these areas comprise a larger number of bytes than are actually shown in FIG. 11. The user data is encoded with C3 type error correction code.

During operation, the data is written into a buffer (in the encode/decode function block 74 of FIG. 4) as previously described, and the data from the buffer is read out for recording on tape. The data in the subarea, while written into the buffer as a stream of data, will be read out of the buffer and written onto tape incrementally, which necessarily spaces on tape each byte of information from its adjacent byte in the subarea when it is recorded. As previously described, the error correction code is more comprehensively described in the above-referenced application entitled "Triple Orthogonally Interleaved Error Correction System", by Kirk Handley, Donald S. Rhines and William McCoy.

The subarea of 192 bytes is organized as shown in FIG. 12 which includes six subblocks 0 through 5, with each subblock having 32 bytes of data. Subblocks 0, 2 and 4 contain the identical information and that information is shown in FIG. 21 which includes data relating to the physical block being written. Subblock number 1 of the subarea contains volume format information and the content of this information is illustrated in FIG. 22. Subblock 3 is reserved for future use and the system currently does not use any information in these 32 bytes. Subblock 5 contains a time stamp indicating in real time when a recording is made, as well as vendor information.

With respect to the data recorded in subblock 0, 2 and 4 shown in FIG. 21, it comprises physical block information relating to the physical block being recorded in its associated helical track. It includes the format identifier (FID) in byte number 0 which is an 8-bit byte, the contents of which are shown in FIG. 23. As is shown in FIG. 23, this byte specifies whether the tape has been preformatted. If pre-formatted, it would have the physical address track recorded with relevant information and also the servo track. Bit 5 of the FID byte specifies whether system zones have been enabled, bit 4 indicates whether a partition table is provided or not. In this regard, a partition table, as will be described, includes information relating to the location of the partitions and system zones that have been defined for the tape. While it is possible to partition the tape with two sizes of partitions that are defined in terms of the number of partitions and the size of partitions of each type, the use of a partition table, which is located at the beginning of tape and immediately after each system zone, enables many different sizes of partitions and system zones with their location being specified are possible.

Returning to FIG. 21, the physical block information also includes information in byte number 1 which identifies the zone type and it contains four bits which identify whether the zone is an information zone, a volume format information zone, a load operation zone, or reserved zone. If the zone type indicates that the zone is an information zone, then the other bits of byte 1, in conjunction with byte 2, identify the partition. If it is not an information zone, then these bits define the type of physical block double frame that is contained in partition group B.

Byte 2, in conjunction with byte 1, identifies the partition if the zone is an information zone, otherwise it identifies the system zone. Bytes 3–6 specify the file section number of the user data which is being recorded, and bytes numbers 6–11 specify the first data block number in the helical track being recorded or if a stream of data such as from an instrumentation recorder is being recorded, and which have no logical data block boundaries, then the byte number is recorded in these fields. Byte 12 utilizes bits to specify whether data blocks as opposed to bytes of data are being recorded, whether a data block check sum is enabled (a check sum is not useful for recording bytes of data from an instrumentation application).

Byte 12 also contains an EMW flag, which is set when a double frame being recorded is within ten double frames of the end of a partition on the tape. Byte 12 bits 4–0 and bytes 13 and 14 also has data defining the size of the user data blocks being recorded. Bytes 15, 16 and 17 specify the total count of total user data bytes in a physical block double frame. If recording of data blocks is being done, so that data block check sum bytes are included, the total byte count includes all the data block check sum bytes in its count. The range of this field is from 1 to 1,199,840.

Byte 18 comprises a physical block sequence tag that will be hereinafter described. Byte number 19 enables rewriting of physical blocks upon lack of verification of accuracy of the physical block being recorded, as well as a rewrite count that is permitted and which is remaining, with the count preferably having a maximum of 20. Bytes 20 through 25 specify the cumulative data block/byte number which represents the total count of all user data blocks that have been recorded in the partition.

Bytes 26 through 28 specify the absolute double frame number which is also recorded on the physical address track and this number identifies each double frame regardless of its type or the information that was contained in it. Four bits of byte 29 specifies the type of double frame, of which there are presently only one.

The other four bits of byte 29 specify the helical track type, which is an identification of the seven different types of double frames that have been previously described. These are shown in FIG. 20 and include the various end of recording types of double frames, the beginning of media double frame, as well as demark, amble and data double frames. The final byte 31 comprises seven bits of subarea subblock cyclic redundancy check (CRC) information which is inverted.

Volume Format Information

The data contained in the 32 bytes of subarea subblock 1 relate to volume format information data and comprises data relating to partitions and system zones. This information is included in the subarea that is recorded on each helical track so it is recorded in the helical recording area. Moreover, at the physical beginning of media and after each load operating zone, there is a volume format information zone which contains this information, and possibly a volume format table as previously described.

Turning now to FIG. 22 which illustrates the volume format information that is contained in subblock 1 of the subarea data of each helical track, byte number 0 has two bits dedicated to a partition layout option which specifies how data is to be written in a partition when a system zone is encountered. In this regard, it should be understood that a system zone may occur in the middle of a partition and these two bits specify whether the portion of the partitions before and after the system zones are to be treated. It should be understood that a discontinuity in the partition would result in an interruption during data transfer, but the partition size or capacity is neither increased or decreased by a system zone being present. If a pack option is chosen, then a second partition is always abutted against a first partition. If the pack option is disabled, the second bit specifies a stretch or a waste option. The stretch option extends the prior partition to the beginning of the system zone and begins a new partition at the opposite side of the system zone. This is done during recording or during a pre-formatting operation. The second bit may also specify a waste option in which the tape after the end of the previous partition and before the system zone is not used to record information and that partition is begun on the other side of the system zone.

The other six bits of byte 0 and byte 1 specify the system zone size and bytes 2, 3 and 4 specify the system zone spacing. In the event that a volume format table is not used, the system permits two sizes of partitions which are defined as group A and group B partitions and bytes 5–7 specify the size of partition group A partitions with byte number 8 specifying the count of them. Bytes 9 through 11 specify the group B size with byte 12 specifying the count of group B partitions.

Bytes 13–18 are used for vender identifier and provides a record which enables a subsequent system which reproduces recorded tapes from another system to identify the prior system where the recording was done in the event that there is a problem with the recording that could warrant repair and/or correction. Bytes 19–21 specify the last double frame number that is the double frame at the physical end of media (PEOM) and should not be used for recording. Byte 22 specifies the last valid system zone. Byte 23 and four bits of byte 24 identify the last valid partition with the other four bits of byte 24 specifying the partition group A physical block double frame type. Bytes 25 through 30 specify the volume identifier data and byte 31 includes subarea subblock 1 CRC inverted data.

Volume Format Table

The system 20 has the capability of providing a volume format table that is located at the beginning of tape and near the end of each system zone, with the volume format table providing data that specifies the location of each partition and system zone that is present in the volume or tape cassette. An advantage of the use of the volume format table is that partitions and system zones of virtually any size within the constraints of the system can be established, and one is not limited to the use of the predetermined size of partitions that is supported by the group A and group B partitions in the volume format information in subblock 1 of the subarea data. This adds to the flexibility and use of the system and does not impose constraints on the size and location of partitions and system zones that may be desired by a host system. The inclusion of the volume partition table after each system zone and at the beginning of tape permits the tape cassette to be loaded at any system zone and the system can immediately obtain the partition information for the entire tape.

The table is structured as shown in FIG. 24. The table is a fixed size, preferably 9,004 bytes that can contain up to 1,125 entries. It has three parts as shown in FIG. 24, the first part of which specifies the number of valid table entries in the table. The second part comprises 9,000 bytes and is used to contain up to 1,125 eight byte table entries. If less than 1,125 table entries are used, the unused space is preferably filled with zeros. A third part of the table comprises two bytes in which a partition table check sum is provided and it is derived by adding the 9,002 bytes on a byte-by-byte basis and then taking the one's complement of the sum and keeping the least significant 16 bits as the check sum.

The table enables the volume to be divided up to 1,124 nonoverlapping but contiguous tape sections and for each table entry there is one eight byte section. The order of the section entries in the table are established based on the location of each section relative to the beginning of tape. For example, the section entry for the first VFI zone shall always be the first entry of the table and shall occupy bytes 2 through bytes 9 of the table. Also, each table has one end of volume entry following the last tape section entry. With respect to the section entries, they identify the type of a tape section, its beginning location and an associated identifier if applicable.

The definition for section entries is set forth in FIG. 25 and is largely self-explanatory. The starting double frame number for the section specifies the double frame identification number of the first double frame of that section. The physical block double frame type specifies the type of physical block double frame that may be used in that section. The partition/system zone identifier located in four bits of byte number 4 and byte 5 comprises a 12-bit field that is used to sequentially number the partitions for the system zones in a volume. Four bits of byte 6 specifies the table entry type which includes either the beginning of the first VFI zone, the beginning of a system zone, the beginning of a partition or the continuation of a previous partition.

With respect to the end of volume entry, i.e., the last entry in the table, it is shown in FIG. 26 and includes data relating to the last valid system zone identifier, the last double frame number of the volume, the last valid partition number, and a portion of a byte which specifies that it is the end of volume entry.

Types Of Double Frames

In accordance with an important aspect of the system disclosed herein, recording and reproducing of user data blocks, that are formatted into double frames of information, are recorded on 32 helical tracks, as has been previously described. The system 20 operates to perform recording and reproducing of double frames with a major consideration residing in the identification of each double frame being of a particular type.

As previously described, there are seven types of double frames which are set forth in FIG. 20. The type of double frame is specified in byte 29 of the physical block information (see FIG. 21) which is recorded in subblocks 0, 2 and 4 of the subarea section of the system format data recorded in each helical track of each double frame. Thus, each recorded physical block or double frame of data is a specified type of double frame. In addition to the HTTY field being uniquely specified for each type, there are other fields in each type of double frame that are different in various ones of the types.

In FIG. 21, the various fields of data are set forth and for a data track type double frame, the fields set forth in FIG. 21 are all applicable. A data track double frame has its HTTY field set to 0101 and the double frame is used to record user information as well as system format information concerning a recording.

When a recording is to be made in any partition, a number of beginning of media double frames (BOM DF) are recorded to permit the system to become synchronized and it is preferred that approximately two seconds of BOM DF's be recorded and for this reason 25 BOM double frames are recorded in this area.

When the recording is begun, under certain conditions such as an append recording where additional double frames are recorded on an existing recording at the end of prior recorded data, an amble double frame will be written. All of the data written in the helical tracks except for the subarea data and the error correction code data is the fill pattern and no user data is recorded in an amble track.

In accordance with another important aspect of the amble double frame is the fact that when amble double frames are recorded, two double frames are recorded, with the first having the unique characteristic that the recording heads of the scanner are not energized during the first 16 tracks. This results in a gap between the prior recorded double frame and the first amble double frame that is approximately ½ of the width of the double frame. The gap is useful in compensating for any tracking misalignment that may exist with the system recording the new data and the prior recorded double frame. If the prior recording was done in another machine, the tolerances may be different between that machine and the system in which the present tape cassette is located and the placement of the gap will preclude the new recording from possibly destroying some of the latter tracks of the last double frame of the prior recording. The recorded amble double frame provides an area of new recording that may be needed to obtain synchronization for recovering the subsequent data of the new recording. As will be discussed hereinafter, the present system distinguishes between recordings that were done possibly on another machine and the present system and if the prior recording was done on the same machine during the same tape load, it is unnecessary to perform a gapped append type of recording and amble frames may therefore not be required. If the last 16 or all of the 32 tracks in a double frame are of the amble track type, the double frame is an amble double frame.

The recording format of the system generally involves the tape being moved in the forward direction with the scanner heads recording helical tracks successively along the tape and if double frames that are recorded are then detected to be inaccurate, i.e., the double frame fails to meet the verification criteria, the double frame will be re-recorded downstream. This is in contrast to stopping the tape, returning it to the location where the double frame was not accurately recorded and re-recording over the double frame that proved to be inaccurate.

In fact, the system records physical blocks, and maintains the data recorded in those double frames in the system buffer until the read heads on the scanner read the recorded track and the read data is then analyzed to determine if it is accurate or not. If it is detected to be inaccurate, the system again records the double frame if it is detected early enough, or a prior double frame in addition to the double frame currently being written are again recorded if the prior double frame was inaccurate and such inaccuracy was detected later. If the prior double frame was detected to be inaccurate, the current double frame being recorded will be converted to a demark double frame wherein at least the last 12 helical tracks are provided with the demark designation which has its HTTY field set to "1011". As will be described hereinafter, once a data double frame is converted to a demark double frame, the double frame and the prior double frame are rewritten according to the original sequence.

The system also utilizes end of recording to provide a mark that a recording operation has ended. End of recording consists of two double frames of identical types and there are three types of end of recording double frames (an EOR, an EOR/T and an EOR/E double frame). The EOR/T double frame represents an entity used to identify the current end of recording of a partition. If there are more than one EOR double frame in a partition due to overwrite recording on already recorded tape, the EOR that is closest to the beginning of media of the partition is considered to be the valid one.

The normal EOR consists of two consecutive recorded EOR double frames. The file system number FSN fields of the first EOR double frame have the same values as the FSN of the last physical block or double frame. The FDBN of both EOR/T double frames will be one larger than the last physical block number of the last physical block or equal to the FDBN if the last physical block is an empty physical block. All of the FSN fields of the second EOR double frame shall be equal to the sum of the FSN of the last file section and the additional tape marks counts recorded. The FDBN fields of the second EOR double frame shall all be set to zeros. If there is an append recording, the EOR double frames of any of the three types will be overwritten by the new recording and the new recording will then end with two EOR double frames of one of the three types and may be at a different location.

In addition to the normal EOR double frame, an EOR/T or temporary end of recording can be written and it consists of two consecutively recorded EOR/T double frames located in each track. The EOR/T double frames are automatically recorded by the system 20 when the record operation is temporarily stopped due to lack of data from the internal buffer. All of the FSN fields of both EOR/T double frames shall have the same FSN value of the last recorded physical block. The FDBN of both EOR/T double frames will be one larger than the last physical block number of the last physical block or equal to the FDBN if the last physical block is an empty physical block.

The last EOR double frame type is an EOR/E or error end of recording and it consists of two consecutively recorded EOR/E double frames. This EOR is recorded by the system to indicate a detection of recording failure and the recording operation is terminated by the recorder. It is in the inherent operation of the system that there will always be one demark double frame located between the failed physical block double frame and the EOR/E double frame. All of the FSN and FDBN fields of both EOR/E double frames shall be set to the FSN and FDBN value of the physical block that was the cause of the recording failure. Due to the recording of EOR double frames, the gapped append using amble double frames will not produce an unrecorded gap on tape.

Recording and Logical Overrecording Double Frames

The system records data blocks in a partition by appending to the BOM of the partition if physical blocks or file marks are to be recorded. For a partition which already contains recorded physical blocks, writing can start in the recorded area and this is called an overwrite or overrecording. Overrecording will invalidate all existing recording downstream or behind the starting point of the overwrite.

Of the seven types of double frames that have been hereinbefore described, only the physical block double frame and the EOR double frames are recorded under commands. The other five types of double frames are recorded automatically by the system, either during the formatting process, e.g., BOM double frames, or when certain situations arise as will be described.

A physical block will be recorded in one or more physical block double frames that are interspersed with demark double frames and/or amble double frames if rewrite or gap append has occurred, respectively. Demark double frames and amble double frames will have the identical PTID, FSN and FDBN values with the physical block double frames being recorded. If the recording is not ended with an EOR/E, the last physical block double frame is considered as containing a valid physical block. A file mark is recorded implicitly as an increment of the file section number (FSN) or explicitly as a normal EOR. The explicit file mark recording will be converted to the implicit file marks when append recording is performed.

The recording format may be more readily understood while referring to FIG. 9, FIG. 9(*a*) of which depicts several double frames 1–5 which are recorded without failure and the end of the recording therefore has two EOR double frames which end the recording, those being shown in locations 6 and 7.

If there are additional double frames that are to be added to the recording of recording shown in FIG. 9(*a*), i.e., an append recording, then as shown in FIG. 9(*b*), the EOR double frames at locations 6 and 7 will be overwritten with physical block double frames 6 and 7, and when that recording has successfully ended, additional EOR double frames are recorded at locations 8 and 9 to identify the end of that recording.

The append recording shown in FIG. 9(*b*) requires that the double frames 1 through 5 as well as 6 and 7 are recorded by the same system and that the physical tolerances result in the inclination of the helical tracks be the same in one double frame as those of an adjacent double frame. Therefore, there is little chance that an append recording would destroy tracks of the prior double frame. In this case the first track of double frame 6 would not overwrite any of the ending tracks of the double frame 5.

If the failure of write verification of a physical block double frame is detected before the beginning of the next double frame recording and if no boundary condition exists, the same physical block is recorded at the next double frame. Referring to FIG. 9(*c*), and particularly during the writing of the double frame 5, if the write verification fails during the early portion of the writing of the double frame, i.e., early detection, the same double frame 5 will be rewritten at the next double frame, in this case at location 6.

In the event there is a late detection of write verification which is not verified until the system is recording the following double frame 6, the double frame 5 will have been recorded without any indication that it is defective. However, the write verification failure for the physical block 5 written at location 5 will cause the physical block 6 at location 6 to be demarked and the buffer information containing the physical blocks 5 and 6 will be used to rewrite physical block 5 in location 7 and physical block 6 in location 8. Because of the above-described manner in which write verification is accomplished, upon recovery or reproducing of the physical blocks, it is always necessary to examine two successive physical blocks after a subject physical block to confirm that the subject physical block is valid.

As previously mentioned, the system 20 supports a gapped append, which is illustrated in FIG. 9(*e*). The gap append is used as a precautionary method by providing a gap between old and new recording to prevent the new recording from damaging an existing recording. Without the gap, the new recording if done by a recorder with different track curvature, may overlap onto some track of the old recording and damage the old recording. The gap is provided by appending two amble double frames to the old recording before recording physical blocks or an EOR double frame. The first of the two amble double frames will have its last 16 tracks recorded new and the first 16 tracks will be left intact with whatever was recorded previously. The previously recorded 16 tracks become the buffer zone or gap between the old and the new recording.

The system 20 can overwrite prior recordings in one of two ways, i.e., a full or a partial overwrite which is dependent upon whether the first data block to be overwritten is at the beginning of a physical block double frame or not. If the first data block to be overwritten is the first data block of the physical block containing it, the whole physical block will be overwritten in the manner described in connection with 9(b).

However, if the first data block to be overwritten is not the first data block of the physical block containing it, then that physical block will be preserved, and the overwrite will start at the next double frame with a physical block having that prescribed data block as its first data block. This is diagrammatically illustrated in FIG. 9(f) wherein a double frame "n" contains a file section number "m" and a first data block number 10 and a last data block number 21 the latter of which is calculated by the system. If the host system commands a rewriting of data blocks beginning with data block 15, it should be appreciated that data block 15 through 21 would have been recorded in double frame "n". Therefore double frame "n" is retained since it contains presumably valid data block numbers 10 through 14 and double frame "n+1" is recorded beginning with the first data block number 15 and it will have data blocks 15 through 35 within it.

Nonrecording Failure Detection

The system disclosed herein has the capability of recording data on a tape that has been previously recorded without the necessity of degaussing the tape. Because of this capability, it is possible, if not expected that many locations along a tape will have data written over previously recorded data.

Since the double frames begin at predetermined locations along the tape, previously recorded double frames may otherwise appear to be part of a later recording, if the later recording did not actually record new data. Stated in other words, if there is a nonrecording failure that occurs during recording of data and the nonrecording failure occurs when an old recording is intended to be overwritten, then there will be areas on tape where the new data will not be recorded. If this is not detected, then during reproducing, the system will be reading the old pre-recorded data that is not valid. Such a nonrecording failure can be caused by various problems, including the failure of a recording channel, the failure of a recording head or the temporary clogging of a recording head.

The system has the capability of determining whether a nonrecording failure has occurred by virtue of data that is recorded in the subarea matrix, and particularly the physical block information field of the subarea matrix data. Referring to FIG. 21, byte 30 includes cyclic redundancy check data which is generated for the entire physical block information subgroup (see FIGS. 11 and 12) and it will have a unique content by virtue of the inclusion in the recorded physical block information of the absolute double frame number (ADFN) and the cumulative data block/byte number (CDBN). Since both of these numbers increment during the recording of the user data, the generated CRC data will be unique for each track.

As has been previously described, the system has a read-while-write capability wherein a read head reads the data that has just been recorded during a recording operation. The read heads on the scanners preferably read the adjacent track that has just been recorded.

The data that is recorded is also stored in a buffer as has been previously described, for the purpose of performing an accuracy verification, so the cyclic redundancy check data is necessarily present in the buffer. The CRC data recovered during the read-while-write operation can be compared with the CRC data written in the buffer, and if the comparison does not reveal an identical value, then the system determines that a nonrecording failure has occurred.

Alternatively, a time stamp located in subblock 5 of the subarea data (see FIG. 12) is used to record the specific time in which a double frame was recorded, with the time including the portion of a second, the minute, hour and date in which the double frame was recorded. In this regard, the system includes a 250 Hz internal clock which provides such information for 100 years starting with the year 1990. Upon recovery during reproducing, the specific time in which the double frame was recorded can be compared with specific times of that double frame that is contained in the buffer, and if the time is not identical, the system will generate data indicating a nonrecording failure.

Still another alternative is to use the CDBN of each physical block for the check. Since the CDBN will be different for each physical block within a partition, it provides the required uniqueness in detecting a nonrecording failure.

The Servo Track

Figure 7:
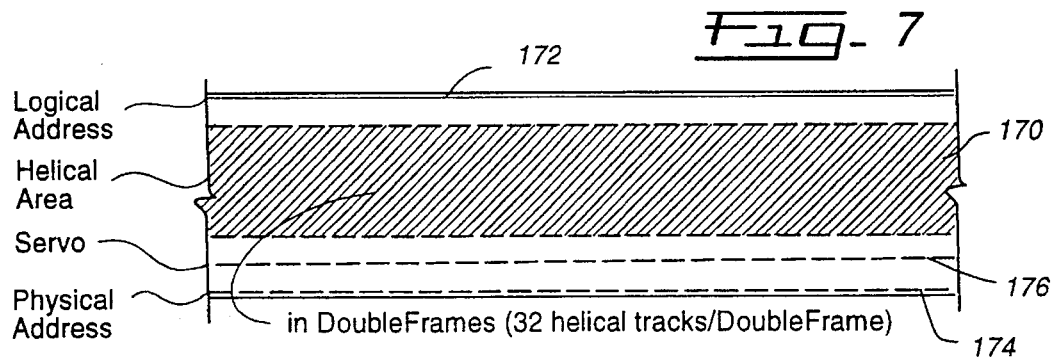
FIG. 7 is a schematic illustration of a segment of magnetic tape and illustrating the format of various recording areas and tracks which are utilized by an embodiment of the system arranged to record and reproduce data in a rotary head helical scan magnetic tape recorder.
Figure 8:
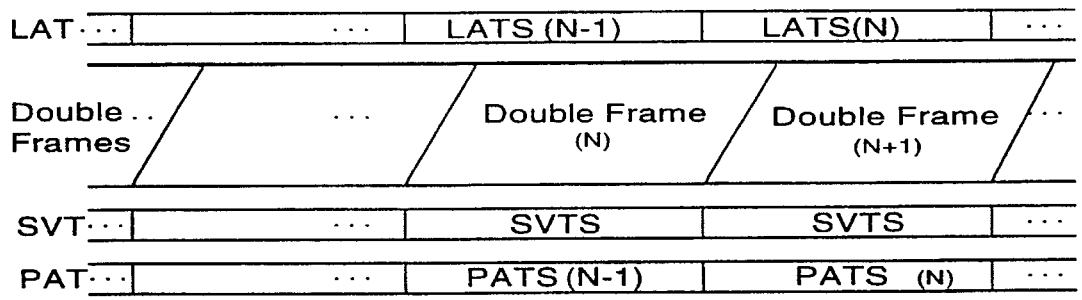
FIG. 8 is a schematic illustration of a segment of tape, similar to that shown in FIG. 7, but particularly illustrating the format of recorded segments in the various recording areas and tracks of the tape.

The digital servo track shown in FIGS. 7 and 8 includes data that is shown in FIGS. 17 and 18, which data comprises four different fields, each of which comprises a 12 bit field and which are shown in FIGS. 18(a), 18(b), 18(c) and 18(d). A field is written or recorded on the servo track for each track pair, so that each double frame will have 16 fields written along the servo track. The fields are selectively written on the servo track depending upon the location of each track pair, and the locations are shown in FIG. 19. More particularly, the field of FIG. 18(a) is written in all but the 0 and 8th track pair, the field of FIG. 18(b) is written at the 8th track pair, the fields of FIGS. 18(c) and 18(d) are alternately written at the track pair 0.

Each of the fields, when reproduced, appear to be identical to a servo reproducing head when the tape is moved in either the forward or rearward directions. The fields comprise data which in the first half of the field are reversed in polarity relative to the second half of the field. Also, the location of the transitions from the left in the lead servo mark identifier are the same as the location of the transitions from the right in the trail servo mark identifier.

As shown in FIG. 18, each of the four fields includes a lead servo mark identifier and a trail servo mark identifier, with an ANSI sync word positioned between the lead and trail servo mark identifiers. The ANSI sync word is also used to determine the direction of tape motion during reproducing.

With respect to the servo track, the structure of it is such that it has the same recovery time regardless of the direction of searching and the transition in the middle of the ANSI sync word is the digital equivalent to the peak of a spike that normally occurs in analog servo tracks. As is shown in FIG. 19, there is one servo pulse for each pair of tracks. The leading and trailing servo mark identifier sections of the 12-bit field also have an error correction aspect in that for each type of 12-bit field which identifies either a single track pair, a single frame, a double frame or a quad pair, there are two bits in each identifier that are different from bits of another type of identifier, which aids in reliable recovery of data which indicates the type of pair that is to be identified. It is therefore less error prone. Prestriping the tape means only the servo track has been prerecorded.

Longitudinal Address Tracks (PAT and LAT)

All of the information that is recorded on the longitudinal tracks, including the physical address track and the logical address track, which relate to the physical blocks that are recorded, is identified nominally and monotonically. Therefore, all such longitudinal track information is useful in accomplishing searching.

The main difference between the logical and physical address tracks is that every time there is an over recording or rewrite, for example, the logical track information can change while the physical address track relates to the physical layout of the tape regardless of the logical content that is recorded in the helical recording area.

Since only the logical address track is needed for recording data related to the logical content of data, the servo and PAT tracks are not variant with the helically recorded data, and they can be used to preformat a tape. When a tape is formatted with multiple partitions, the boundary of partitions can be easily positioned to. Thus, the tape can be preformatted by only recording both the servo track and the physical address track. The tape can be merely prestriped which means that only the servo track is pre-recorded which provides some servo consistency upon interchange with other transports. However, the present system fully supports writing all of the longitudinal tracks during a recording operation and no pre-recorded information is necessary for the system.

The longitudinal tracks include the logical address track 172 and the physical address track 174 shown in FIG. 7 and they are written with track segments as shown in FIG. 8. Each logical address track segment (LATS) and physical address track segment (PATS) has a format as shown in FIG. 13 that comprises a front padding portion of 2.5 bytes, a rear padding portion of 2.5 bytes, an ANSI Sync Word of 0.5 byte, and inverted ANSI Sync Word of 0.5 byte and a segment information portion of 18 bytes. The front padding portion comprises ten repetitions of a "10" pattern as is shown in FIG. 16, while the rear padding portion comprises ten repetitions of a "01" pattern as shown in FIG. 17. The use of the ANSI sync word in the logical address track, as well as the physical address track and the servo track enables the synchronization of information from each of these tracks to be accomplished.

The inverting of the ANSI sync word near the rear padding portion of each of the longitudinal address track segments allows detection of encountering a segment during movement in the reverse direction to be the same as in the forward direction.

The front and rear padding enable the system to become synchronized so that the information relating to each segment can be recovered and also the front padding provides a gap of space which may be partially overwritten during an append recording, and the padding will isolate each segment information portion so that it will not be destroyed.

With respect to the physical address track segment information, there is only one type of segment information being recorded, and the information recorded in it is shown in FIG. 15. As is evident from the information shown in FIG. 15, the data specifies physical parameters of the tape, including the absolute double frame number (ADFN), the volume identifier (VLID), system zone size (SZSZ) and system zone spacing (SZSP), all of which relate to locations on the tape regardless of the content of the data recorded in the helical tracks.

With respect to the logical address track segment (LATS) information, there are four different types of segment information written depending upon the content of the data being recorded on the helical tracks. As shown in FIG. 14, type II, type III or no LATS segment information is written in the beginning of tape zone and type II segment information is written in all the volume format information zones. Type I, III or EOR segment information is used in the information zones when physical block double frames are being recorded. Type I is recorded when physical block, amble or demark double frames are being recorded. Type III is only used for initialization purposes. Type II information is also written in all the load operating zones (LOZ) of a system zone, and the end of tape zone (EOT) contains type III or no segment information. The information for each of the types is shown in the various columns of FIG. 15.

The end of recording (EOR) type of segment information as shown in FIG. 15, comprises 36 ANSI sync words which are important during searching and enables high speed searching to be performed and the information can be obtained simply using word detecting circuitry without involvement of decoding and other software and quickly identifies an end of recording during the searching process. This pattern is only recorded on the LAT segment associated with the second double frame of an EOR of any of the three EOR types. An existing EOR LATS will be overwritten by any append operation and be replaced by a new EOR LATS written probably downstream. The reason for the overwrite is to leave only one valid EOR LATS in a partition.

Physical Block Sequence Tag

The system uses a physical block sequence tag to sequentially number each physical block within a partition during recording and this sequence tag enables the system to determine during recovery whether physical blocks have been lost and also how many have been lost.

Such information is necessary because of the partial or logical overwrite capability of the system. Because of the manner in which the FSN and FDBN numbers are used to support partial rewriting of data blocks in subsequent double frames and the fact that when such partial overwrites are performed, the subsequently recorded physical block containing the data that is overwritten is given the same file section number FSN and a FDBN that duplicates the data blocks in the prior physical block, then these two items of data do not necessarily indicate whether a physical block has been lost. It is for this reason that the physical block sequence tag is used to consecutively number different physical blocks during recording.

While the sequence tag value is set to sequence for each physical block that is written, it is given the same sequence tag number as the previous physical block if it is a complete overwrite or rewrite. Similarly, those physical block double frames will also carry the same PTID, FSN and FDBN values.

Partition Access Bookkeeping

The system 20 supports a record keeping journal of recording, searching and reading activities that are performed during a current load of a cassette, and the information is stored in a memory. As part of the partition access bookkeeping, the first time that a recording is done in each partition of a tape after it has been loaded and the host has provided a location in which recording is to occur, the first recording of the actual user data in each partition is not done until two amble double frames have been recorded, with the first amble double frame having the first 16 tracks inhibited.

The partition access bookkeeping thereafter keeps track of whether the recording is being performed by the same machine during the same load and decides whether a gapped append should be performed when the tape is repositioned to record information at a different location on the tape. The bookkeeping aspect of the system keeps track of every partition on tape. Every time the system relocates the tape to a new partition, a gapped append amble double frame is written within the partition and by virtue of the bookkeeping aspect, thereafter further recording in a partition which has been recorded will determine whether the append recording is being added to the new recording or if it was an old recording.

If the append is to add further data to the recording in a particular partition in which recording was done during the present session, then a gapped append is not called for. An amble double frame is transparent in the sense that it will not cause any problem during reproducing or searching for data to provide the data from the system to the host system.

When a tape is loaded into the system, none of the partitions have been accessed so that during a search operation the tape is moved to the beginning of the partition during an initial search. Once a partition has been accessed, then the system keeps track of the highest accessed location that has been accessed in that partition. For example, if a partition has been accessed to perform an append recording, then at the end of the append recording where two EOR frames have been written, the locations thereof are therefore known and their locations are written into the memory.

Since the location of the end of recording is therefore known within the partition, then that information can be used to perform a search from either the forward or the reverse tape direction, because the system then knows where the end of recording is within the partition. Because data can be written over prior recordings with the prior recordings having end of recording double frames written thereon, the prior recorded information would not reliably enable accurate searching to be done because the system would not know, without the partition access information, whether another end of recording double frame would have been written previously at a location nearer the beginning of the partition. If the current target is before the highest accessed location kept in the bookkeeping record for the partition, reverse searching would also be allowed, since the highest accessed location cannot be beyond the EOR even if its location is not known.

Also, if during a prior search, the highest accessed location before an end of recording double frame was encountered and therefore the end of recording location was not determined, during a reverse search, if the current target is after the highest access location, the bookkeeping information is used to locate the tape at the address and the search is then done in a forward direction to find the target. This is necessary because the system would not know where the valid end of recording occurred. The information that is stored in the memory includes the highest accessed address in each partition, including the file section number (FSN) in each partition, the data block number (DBN) and the cumulative data block number (CDBN).

Thus, the bookkeeping capability may considerably shorten the time required to perform the search. Therefore, from the above it should be appreciated that the information that is most relevant is the valid end of recording aspect and if access to the partition has been done in order to read information from the partition, then the highest read location is necessary to perform reliable searching. If the fact that an append recording has been performed is known, then the searching can be done in either direction with a single frame of information.

Longitudinal Searching

With respect to longitudinal searching that is done by the system, it searches in one of two search modes, one of which is a logical search mode and the other an absolute search mode. When in the absolute search mode, the ADFN or absolute double frame number is searched, and it is located on the physical address track. Since during loading, the system knows where on tape it is as soon as it begins to read information from the physical address track and because the absolute double frame number is a monotonically increasing value from double frame to double frame, it is relatively easy to transport the tape to the desired location and the ADFN numbers can be retrieved while searching so effectively it is almost like a footage counter. This type of searching enables high speed movement of the tape to be used and may be a tape speed such as approximately 60 times the normal recording speed.

With respect to the logical search mode of operation, which is to look for a particular data block within a recorded partition, the system does not know where in a partition the data block is located. Since the partition in which the data block is located is known, once the tape is moved so that the partition in which the data block is located is encountered, the servo slows the tape movement to no greater than preferably approximately 30 times normal recording speed so that the logical track information can be recovered.

The search operation continues during movement of the tape until the parameter that is being searched is overshot. When moving in the forward direction, the system moves the tape to a partition and the searching is for a DBN of a file section number. Because of the manner in which double frames are demarked, even if the target file section number and DBN number is located during a forward search, it is necessary to go on to determine if the prior number was a valid physical block, and therefore it is necessary to overshoot by a number of double frames that are required in order to confirm that the first target value was in fact a valid double frame. For forward search, the confirmation is achieved when there are two consecutive logical address track segments containing FSN and/or FDBN that are larger than the FSN/DBN of the target. During a reverse search, the first encountering of a logical address track segment containing a FSN and/or FDBN that is equal or less than the FSN/DBN of the target concludes the search.

The system can either search for the file section number (FSN) and the DBN, but not a DBN number alone, because there can be many possible DBN numbers that match the target number that is being searched. However, for any particular file section number there will be only one DBN number for a valid data block and the combination of these two characteristics would yield the desired data block that is being searched. Alternatively, there is only one unique cumulative data block number CDBN and a reliable search can be accomplished using this parameter rather than a FSN together with a DBN. The search from a forward direction will start at the partition and it will continue until the target is reached or an EOR double frame is encountered.

During a logical track search the system moves the tape to the area in which the data block is believed to be located. However, the system requires confirmation of the location by a subsequent search of the helical tracks done in a helical search to be described, because among other things, the longitudinal tracks are not encoded with error correction coding and are not totally reliable.

The logical searching is done in conjunction with the partition access bookkeeping information. To search a given partition, the system examines the information known about the partition. If no bookkeeping information exists with respect to a partition, the system will access the partition at its beginning and then it will begin the searching.

If the partition access bookkeeping provides a known access point from a prior search and read operation, the target data block can be compared with that information and if the data block cannot be between the beginning of the partition and the highest accessed location (not an EOR), the system uses the known access point as a starting point to do the searching in the forward direction until the target data block location is actually found. Once the logical search on the longitudinal track is accomplished and the target is believed to be found, the system moves the tape to a pre-roll position that is preferably approximately two seconds worth of tape where the helical search is started and it will perform its search for the actual data block that is being searched for.

If the target data block is between the beginning of the partition and the highest accessed location, the system can search from the access point to the target in the reverse direction, or from the beginning of the partition to the target in the forward direction. Successfully completion of a search may provide new access locations for the partition accessing bookkeeping information.

Helical Searching

With respect to the helical search mode, it is first necessary to determine that the physical block double frame contains a valid physical block, which requires reproducing at least two additional or subsequently recorded double frames to determine whether a subsequent double frame has been designated as a demark double frame. Once the physical block is determined to be valid, the physical block is searched to locate the target data block which is being searched for. The end of file is defined as the last physical block with the same FSN. If a successive double frame contains a file section number that is greater than the prior one, it is defined as the beginning of a new file section. The beginning of a file has a new file section number with a FDBN number equal to zero.

The mixed mode type of search is an extension of the longitudinal track search and the helical track search whereby a host system has a bookkeeping system that it uses and it can command that a search be done to the system whereby it will request a search be done for a particular data block and it will also provide an ADFN number that it sends to the system 20 and in such event, the system will use the ADFN number to shuttle to the location where the block should be located and once it is there, then it will perform the above described longitudinal track search in the reverse direction followed by the helical search to complete the search.

From the foregoing, it should be understood that an extremely powerful data recording and reproducing system has been shown and described which has the capability of storing large amounts of data in an extremely organized manner. The organization of the format of the system enables the system to perform many desirable operational functions, including reliable searching, recording and recovery of the data.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A system adapted to selectively record and reproduce digital user data from a host source on a recording medium, said system comprising:

means adapted to selectively record and reproduce said user data and system format data in physical blocks of predetermined size on a recording area of said medium, said user data arranged as files and contained in predetermined size data blocks, a plurality of which can be contained in each physical block;

address means adapted to selectively record and reproduce data on at least one address track that extends in the longitudinal direction of said medium, said data recorded on said at least one address track comprising physical address parameters relating to said medium and logical address parameters relating to the data that is recorded on said recording area;

servo means adapted to selectively record and reproduce servo information on a servo control track that extends in the longitudinal direction of said medium, said servo means being adapted to control the movement of said medium and move said medium in a forward direction during recording by said means adapted to selectively record and reproduce user data and system format data;

processing means for generating said system format data and for providing said user data and said system format data to said means adapted to selectively record and reproduce user data system format data for recording thereby on said medium, said processing means generating a subarea matrix of said system format data for recording on said recording area, said system format data including a specified identification number for a first data block of each physical block, from which any data block within a physical block can be identified with a specified identification number, said system format data including a specified identification number for each physical block in which data blocks are contained, each successive data block having an identification number incremented from said specified identification number of said first data block and successive physical blocks having incremented identification numbers;

said processing means being adapted to receive instruction data commanding said system to record a predetermined data block having a specified identification number, which data block may have been modified by the host source, said processing means thereafter receiving further instruction data commanding said system to rerecord said predetermined data block;

said processing means in combination with said address means and said servo means causing said medium to be positioned relative to said means adapted to selectively record and reproduce user data and system format data to be at the next physical block following the physical block which contains said predetermined data block, said means adapted to selectively record and reproduce user data and system format data rerecording at least said predetermined data block in said next physical block while generating system format data specifying said rerecorded predetermined data block with an identification number that is the same as the specified identification number of said predetermined data block and generating system format data specifying said next physical block with an identification number that is successively incremented from the physical block identification number of said physical block that contained said predetermined data block.

2. A system as defined in claim 1 wherein all data blocks after said predetermined data block that were contained in said physical block are recorded in said next physical block after said predetermined data block.

3. A system as defined in claim 2 wherein each successive data block recorded in said next physical block after said predetermined data block have a successively incremented identification number.

4. A system as defined in claim 1 wherein said predetermined size of said data blocks are specified by the host source.

5. A system adapted to selectively record and reproduce digital user data from a host source on at least one magnetic tape, said system comprising:

helical means adapted to selectively record and reproduce said user data and system format data in physical blocks of predetermined size on a helical recording area of said at least one magnetic tape, with each physical block being contained on a predetermined number of successive helical tracks which comprise a set of tracks, said user data arranged as files and contained in data blocks having a predetermined size, a plurality of which can be contained in each physical block;

address means adapted to selectively record and reproduce data on at least one address track that extends in the longitudinal direction of said at least one magnetic tape, said data recorded on said at least one address track comprising physical address parameters relating to said at least one magnetic tape and logical address parameters relating to the user data that is recorded on said helical tracks;

servo means adapted to selectively record and reproduce servo information on a servo control track that extends in the longitudinal direction of said at least one magnetic tape, said servo means being adapted to control the movement of said at least one magnetic tape in a first direction and moving said at least one magnetic tape at a predetermined speed in said first direction during recording;

processing means for generating said system format data and for providing said user data and said system format data to said helical means for recording thereby on said at least one magnetic tape, said processing means generating a subarea matrix of said system format data for recording on said helical recording area, said system format data including a specified identification number for a first data block of each physical block, from which any data block within a physical block can be identified by identification data, said system format data including specified identification data for each physical block in which data blocks are contained, each successive data block having identification data incremented from said specified identification number of said first data block and successive physical blocks having incremented identification data;

said processing means being adapted to receive instruction data commanding said system to record at least a predetermined data block having specified identification data, which data block may have been modified by the host source;

said processing means in combination with said address means and said servo means causing said at least one magnetic tape to be positioned relative to said helical means to be at the next physical block following the physical block which contains said predetermined data block, said helical means rerecording at least said predetermined data block in said next physical block while generating system format data specifying said rerecorded predetermined data block with identification data that is the same as the identification data of said predetermined data block and generating system format data specifying said next physical block with identification data that is successively incremented from the physical block identification data of said physical block that contained said predetermined data block.

6. A system as defined in claim 5 wherein said identification data identifying each physical block comprises data that provides an identification number for each physical block, with the number incrementing for each successive physical block that is recorded.

7. A system as defined in claim 6 wherein said identification data identifying each data block comprises data that provides an identification number for the first data block of each physical block, from which the identification number of any data block within a physical block can be derived.

8. A system as defined in claim 7 wherein all data blocks after said predetermined data block that were contained in said physical block are recorded in said next physical block after said predetermined data block.

9. A system adapted to selectively record and reproduce digital user data from a host source on a recording medium, said system comprising:

means adapted to selectively record and reproduce said user data in physical blocks of predetermined size together with system format data on a recording area of said medium, said user data arranged as files and contained in predetermined size data blocks;

address means adapted to selectively record and reproduce data on at least one address track that extends in the longitudinal direction of said medium, said data recorded on said at least one address track comprising physical address parameters relating to said medium and logical address parameters relating to the user data that is recorded on said recording area;

servo means to control the movement of said medium;

processing means for providing said user data to said means adapted to selectively record and reproduce user data and system format data for recording thereby on said medium and recording a specified identification number for a first data block of user data that is recorded in a particular physical block, and a specified identification number for each physical block in which each data block is contained in said system format data, successive data blocks after said first data block in a physical block having successively incrementing identification numbers that can be derived by said processing means and successive physical blocks having successively incrementing identification numbers;

said processing means being adapted to receive instruction data commanding said system to record at least a predetermined data block having an associated identification number, which data block may have been modified;

said processing means causing said medium to be positioned relative to said means adapted to selectively record and reproduce user data and system format data to be at the next incremented physical block following the physical block which contains said predetermined data block, said means adapted to selectively record and reproduce user data and system format data rerecording said predetermined data block in a following physical block while specifying said rerecorded predetermined data block with an identification number that is identical to said associated identification number of said predetermined data block and specifying said next successive physical block with an identification number that is successively incremented from the physical block identification number of said physical block that contains said predetermined data block.

10. A system adapted to selectively record and reproduce digital user data from a host source on a recording medium, said system comprising:

means adapted to selectively record and reproduce said user data and system format data in physical blocks of predetermined size on a recording area of said medium, said user data arranged as files and contained in predetermined size data blocks, a plurality of which can be contained in each physical block;

processing means for generating said system format data and for providing said user data and said system format data to said means adapted to selectively record and reproduce user data and system format data for recording thereby on said medium, said processing means generating a subarea matrix of said system format data for recording on said recording area, said system format data including a specified identification number for a first data block of each physical block, from which any data block within a physical block can be identified with a specified identification number, said system format data including a specified identification number for each physical block in which data blocks are contained, successive data blocks having successively incrementing identification numbers and successive physical blocks having successively incrementing identification numbers;

said processing means being adapted to receive instruction data commanding said system to record at least a predetermined data block having a specified identification number, which data block may have been modified by the host source;

said processing means causing said medium to be positioned relative to said means adapted to selectively record and reproduce user data and system format data to be at the next physical block following the physical block which contains said predetermined data block, said means adapted to selectively record and reproduce user data and system format data rerecording at least said predetermined data block in said next physical block while generating system format data specifying said rerecorded predetermined data block with an identification number that is the same as the specified identification number of said predetermined data block and generating system format data specifying said next physical block with an identification number that is successively incremented from the physical block identification number of said physical block that contained said predetermined data block.

11. A system adapted to record and reproduce digital user data from a host source on a recording medium in data blocks within a physical block, said system comprising:

means for recording data on said medium in numerically sequential physical blocks;

means for recording within each physical block a numeric identifier for a first data block within said each physical block;

means, responsive to detection of an error in a predetermined data block within a given physical block, for
  a) rerecording said predetermined data block and any data blocks sequentially thereafter from within said given physical block into the next sequential physical block subsequent to said error detection, and
  b) assigning, as a numeric identifier for the first data block within said next sequential physical block, the same numeric identifier as derived for said predetermined data block from the identifier for said first data block in said given physical block;

means operative on reproducing data from said medium for detecting the existence of the same data block numeric identifier in at least two adjacent physical blocks, and, in response thereto, reproducing sequential data blocks from said given physical block up to a data block having a numeric identifier one less than the identifier of said predetermined data block and continuing reproducing thereafter only at the next data block of the last physical block having the same numeric identifier as said predetermined data block.

12. A method for recording and reproducing digital user data from a host source on a tape medium in data blocks within a physical block, said method comprising the steps of:

recording data on said tape medium in sequential physical blocks;

recording within each physical block a numeric identifier for a first data block within each said physical block;

in response to detection of an error in a predetermined data block within a given physical block, rerecording said predetermined data block and any data blocks sequentially thereafter from within said given physical block into the next sequential physical block subsequent to detection of said error, and assigning, as a numeric identifier for the first data block within said next physical block, the same numeric identifier as derived for said predetermined data block from the numeric identifier of said first data block in said given physical block;

reproducing said data from said tape medium, and, upon detecting the existence of the same data block numeric identifier in at least two adjacent physical blocks ignoring reproducing data in data blocks within said given physical block beginning with a data block whose derived numeric identifier is equal to the identifier of said predetermined data block and any data blocks sequentially thereafter and continuing reproducing thereafter at the first data block of any physical block thereafter having the same numeric identifier of said predetermined data block.

13. A method of recording at least a modified original data block that is contained in a larger physical block which includes a plurality of data blocks, wherein a succession of physical blocks have been recorded on an elongated recording medium, with the modified original data block replacing an original data block that has been previously recorded, each successive recorded physical block having a designated successively incremented identification number, and each successive recorded data block within a physical block having a designated successively incremented identification number, said method comprising the steps of:

positioning the medium at the next successive physical block relative to the physical block which contained said original data block; and recording said next physical block with said modified original data block being the first data block contained in said next successive physical block, the recording step further comprising designating said next successive physical block with a next incremented identification number and designating said modified original data block with an identification number that is identical to the designated identification number of said original data block.

14. A method of recording a modified version of a predetermined block of data, an original version of which was recorded on a recording medium having other blocks of data recorded thereon, wherein a previous recording was done in a format that has a plurality of successive physical blocks, each of which has successively incremented identification data, with each physical block having a plurality of blocks of data, each of which has successively incremented identification data, said method comprising the steps of:

positioning the medium at a next successive physical block relative to the physical block which contained said predetermined block of data; and recording said next successive physical block with said modified version of said predetermined block of data being a first block of data contained in said next successive physical block, the recording step further comprising designating said next successive physical block with next incremented identification data and designating said modified version of said predetermined block of data with incremented identification data that is identical to the designated incremented identification data of said original version of said predetermined block of data.

\* \* \* \* \*